(12) United States Patent
Maruiwa

(10) Patent No.: US 12,030,483 B2
(45) Date of Patent: Jul. 9, 2024

(54) AUTOMATED VALET PARKING SYSTEM, CONTROL METHOD OF AUTOMATED VALET PARKING SYSTEM, AND AUTONOMOUS DRIVING VEHICLE

(71) Applicant: TOYOTA JIDOSHA KABUSHIKI KAISHA, Toyota (JP)

(72) Inventor: Nobutsugu Maruiwa, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 319 days.

(21) Appl. No.: 17/668,764

(22) Filed: Feb. 10, 2022

(65) Prior Publication Data

US 2022/0258727 A1  Aug. 18, 2022

(30) Foreign Application Priority Data

Feb. 18, 2021 (JP) .................................. 2021-024458

(51) Int. Cl.
*B60W 30/06* (2006.01)
*B60W 60/00* (2020.01)

(52) U.S. Cl.
CPC .......... *B60W 30/06* (2013.01); *B60W 60/001* (2020.02); *B60W 2520/10* (2013.01);
(Continued)

(58) Field of Classification Search
CPC ............... B60W 30/06; B60W 60/001; B60W 2556/65; B60W 2554/802; B60W 2554/801; B60W 2520/10; B60W 2720/10
See application file for complete search history.

(56) References Cited

U.S. PATENT DOCUMENTS

2018/0229719 A1 * 8/2018 Izumi .................... B60W 30/06
2019/0193724 A1   6/2019 Kim et al.
(Continued)

FOREIGN PATENT DOCUMENTS

CN      111739302 A  * 10/2020
JP      2001-061185 A   3/2001
(Continued)

OTHER PUBLICATIONS

Machine translation of CN-111739302-A (Year: 2020).*

*Primary Examiner* — Hussein Elchanti
*Assistant Examiner* — Kenneth M Dunne
(74) *Attorney, Agent, or Firm* — Dinsmore & Shohl LLP

(57) ABSTRACT

The system includes a vehicle information acquisition unit that acquires positional information of target vehicles including the autonomous driving vehicle and a communicative vehicle which is not capable of performing autonomous driving and is capable of performing inter-vehicle communication in the parking place, a condition determination unit that determines whether or not the target vehicles satisfy an inter-vehicle communication traveling condition, and an inter-vehicle communication traveling instruction unit that causes the target vehicles determined to satisfy the inter-vehicle communication traveling condition by the condition determination unit to perform inter-vehicle communication traveling by inter-vehicle communication. In the inter-vehicle communication traveling, the autonomous driving vehicle is caused to preferentially perform vehicle speed adjustment for vehicle approach suppression by the inter-vehicle communication over the target vehicle speed for the automated valet parking.

17 Claims, 14 Drawing Sheets

(52) U.S. Cl.
CPC . *B60W 2554/801* (2020.02); *B60W 2554/802* (2020.02); *B60W 2556/65* (2020.02); *B60W 2720/10* (2013.01)

(56) References Cited

U.S. PATENT DOCUMENTS

| | | | |
|---|---|---|---|
| 2020/0149917 A1 | 5/2020 | Goluguri | |
| 2020/0207334 A1* | 7/2020 | Cho | G06V 20/52 |
| 2020/0207349 A1 | 7/2020 | Mimura et al. | |
| 2021/0335134 A1* | 10/2021 | Park | B60W 30/16 |

FOREIGN PATENT DOCUMENTS

| | | |
|---|---|---|
| JP | 2016-007920 A | 1/2016 |
| JP | 2018-156641 A | 10/2018 |
| JP | 2020-106920 A | 7/2020 |
| KR | 10-2019-0078105 A | 7/2019 |

\* cited by examiner

AUTOMATED VALET PARKING SYSTEM, CONTROL METHOD OF AUTOMATED VALET PARKING SYSTEM, AND AUTONOMOUS DRIVING VEHICLE

CROSS REFERENCE TO RELATED APPLICATION

This application claims the benefit of priority from Japanese Patent Application No. 2021-024458, filed Feb. 18, 2021, the entire contents of which are incorporated herein by reference.

TECHNICAL FIELD

The present disclosure relates to an automated valet parking system, a control method of an automated valet parking system, and an autonomous driving vehicle.

BACKGROUND

In the related art, Japanese Unexamined Patent Publication No. 2018-156641 is known as a technical document relating to an automated valet parking system. This publication discloses a parking place management system that realizes valet parking for a plurality of autonomous driving vehicles at one time.

SUMMARY

However, when valet parking by a plurality of autonomous driving vehicles is performed, even though the same speed is instructed to the plurality of autonomous driving vehicles, since performance (acceleration performance, deceleration performance, accuracy of vehicle speed control, or the like) of the autonomous driving vehicle is different depending on a manufacturer or a vehicle type, there is a concern that an inter-vehicle distance becomes too close.

According to one aspect of the present disclosure, there is provided an automated valet parking system that executes automated valet parking of an autonomous driving vehicle in a parking place by issuing an instruction related to a target vehicle speed and a target route to the autonomous driving vehicle. The system includes a vehicle information acquisition unit configured to acquire positional information of the autonomous driving vehicle in the parking place, a condition determination unit configured to determine whether or not the autonomous driving vehicle satisfies a preset inter-vehicle communication traveling condition based on the positional information of the autonomous driving vehicle in the parking place acquired by the vehicle information acquisition unit, and an inter-vehicle communication traveling instruction unit configured to cause the autonomous driving vehicle determined to satisfy the inter-vehicle communication traveling condition by the condition determination unit to perform inter-vehicle communication traveling by inter-vehicle communication. In the inter-vehicle communication traveling, the autonomous driving vehicle is caused to preferentially perform vehicle speed adjustment for vehicle approach suppression by the inter-vehicle communication over the target vehicle speed for the automated valet parking.

In accordance with the automated valet parking system according to one aspect of the present disclosure, the autonomous driving vehicle determined to satisfy the inter-vehicle communication traveling condition is caused to perform the inter-vehicle communication traveling by the inter-vehicle communication, and thus, the inter-vehicle distance between the autonomous driving vehicles can be maintained appropriately as compared with the inter-vehicle communication traveling is not performed. In accordance with the automated valet parking system, since the vehicle speed adjustment for the vehicle approach suppression by the inter-vehicle communication is preferentially performed over the target vehicle speed for the automated valet parking, it is possible to prevent the inter-vehicle distance between the autonomous driving vehicles from becoming too close as compared with a case where only the instruction of the target vehicle speed is issued to the plurality of autonomous driving vehicles of which acceleration performance, deceleration performance, or accuracy of vehicle speed control is different.

In the above-mentioned automated valet parking system, the vehicle information acquisition unit may be configured to acquire positional information of target vehicles in the parking place including the autonomous driving vehicle and a communicative vehicle that is not capable of performing autonomous driving and is capable of performing inter-vehicle communication, the condition determination unit may be configured to determine whether or not the target vehicles satisfy the preset inter-vehicle communication traveling condition based on the positional information of the target vehicles in the parking place acquired by the vehicle information acquisition unit, and the inter-vehicle communication traveling instruction unit may be configured to cause the target vehicles determined to satisfy the inter-vehicle communication traveling condition by the condition determination unit to perform the inter-vehicle communication traveling by the inter-vehicle communication.

In the above-mentioned automated valet parking system, the condition determination unit may be configured to, when the number of a plurality of the target vehicles in the same lane in the parking place is equal to or greater than a lane number threshold value, determine that the plurality of target vehicles traveling in the same lane satisfy the inter-vehicle communication traveling condition.

In the above-mentioned automated valet parking system, the condition determination unit may be configured to, when there are a plurality of the target vehicles between which an inter-vehicle distance is less than an inter-vehicle distance threshold value, determine that the plurality of target vehicles between which the inter-vehicle distance is less than the inter-vehicle distance threshold value satisfy the inter-vehicle communication traveling condition.

In the above-mentioned automated valet parking system, the vehicle information acquisition unit may be configured to acquire positional information of a general vehicle which is not capable of performing autonomous driving and is not capable of performing inter-vehicle communication in the parking place, and the condition determination unit may be configured to, when there are a plurality of the target vehicles positioned in a lane in which the general vehicle travels in the parking place, determine that the plurality of target vehicles in the lane satisfy the inter-vehicle communication traveling condition.

In the above-mentioned automated valet parking system, the vehicle information acquisition unit may be configured to acquire positional information of a general vehicle which is not capable of performing autonomous driving and is not capable of performing inter-vehicle communication in the parking place, and the condition determination unit may be configured to, when the general vehicle enters a set area preset in the parking place, determine that a plurality of the target vehicles in the set area satisfy the inter-vehicle communication traveling condition.

The above-mentioned automated valet parking system may further include a cancellation condition determination unit configured to, when there are the target vehicles that perform the inter-vehicle communication traveling, determine whether or not the target vehicles satisfy a preset cancellation condition based on the positional information of a plurality of the target vehicles in the parking place acquired by the vehicle information acquisition unit. The inter-vehicle communication traveling instruction unit may be configured to end the inter-vehicle communication traveling of the target vehicles determined by the cancellation condition determination unit to satisfy the cancellation condition.

According to another aspect of the present disclosure, there is provided a control method of an automated valet parking system that executes automated valet parking of an autonomous driving vehicle in a parking place by issuing an instruction related to a target vehicle speed and a target route to the autonomous driving vehicle. The method includes acquiring positional information of target vehicles including the autonomous driving vehicle and a communicative vehicle which is not capable of performing autonomous driving and is capable of performing inter-vehicle communication in the parking place, determining whether or not the autonomous driving vehicle satisfies a preset inter-vehicle communication traveling condition based on the positional information of the autonomous driving vehicle in the parking place acquired in the acquiring of the positional information, and causing the autonomous driving vehicle determined to satisfy the inter-vehicle communication traveling condition in the determining of the inter-vehicle communication traveling condition to perform inter-vehicle communication traveling by inter-vehicle communication. In the inter-vehicle communication traveling, the autonomous driving vehicle is caused to preferentially perform vehicle speed adjustment for vehicle approach suppression by the inter-vehicle communication over the target vehicle speed for the automated valet parking.

In accordance with the control method of the automated valet parking system according to another aspect of the present disclosure, the target vehicles determined to satisfy the inter-vehicle communication traveling condition are caused to perform the inter-vehicle communication traveling by the inter-vehicle communication, and thus, the inter-vehicle distance between the target vehicles can be appropriately maintained as compared with a case where the inter-vehicle communication traveling is not performed. In accordance with the control method of the automated valet parking system, since the vehicle speed adjustment for the vehicle approach suppression by the inter-vehicle communication is preferentially performed over the target vehicle speed of the automated valet parking, it is possible to prevent the inter-vehicle distance between the autonomous driving vehicles from becoming too close as compared with a case where only the instruction of the target vehicle speed is issued to the plurality of autonomous driving vehicles of which acceleration performance, deceleration performance, or accuracy of vehicle speed control is different.

According to still another aspect of the present disclosure, there is provided an autonomous driving vehicle that executes automated valet parking in a parking place based on an instruction related to a target vehicle speed and a target route from an automated valet parking system of the parking place. The vehicle includes a host vehicle position recognition unit configured to recognize a position of the host vehicle in the parking place, a traveling state recognition unit configured to recognize a traveling state of the autonomous driving vehicle based on an internal sensor of the autonomous driving vehicle, a vehicle-side condition determination unit configured to determine whether or not the autonomous driving vehicle satisfies a preset vehicle-side inter-vehicle communication traveling condition based on a comparison result between the traveling state of the autonomous driving vehicle recognized by the traveling state recognition unit and the target vehicle speed or the target route as instructed from the automated valet parking system, and an inter-vehicle communication traveling execution unit configured to, when the vehicle-side condition determination unit determines that the vehicle-side inter-vehicle communication traveling condition is satisfied, perform inter-vehicle communication traveling of the autonomous driving vehicle by inter-vehicle communication with surrounding target vehicles. In the inter-vehicle communication traveling, vehicle speed adjustment for vehicle approach suppression by the inter-vehicle communication is preferentially performed over the target vehicle speed for the automated valet parking.

In accordance with the autonomous driving vehicle according to still another aspect of the present disclosure, when the autonomous driving vehicles satisfy the vehicle-side inter-vehicle communication traveling condition based on the comparison result between the traveling state of the autonomous driving vehicle and the target vehicle speed or the target route as instructed from the automated valet parking system, the inter-vehicle communication traveling with surrounding target vehicles by the inter-vehicle communication is performed, and the vehicle speed adjustment for the vehicle approach suppression by the inter-vehicle communication is preferentially performed over the target vehicle speed of the automated valet parking. Thus, it is possible to prevent the inter-vehicle distance between the autonomous driving vehicle and the target vehicle from becoming too close.

In the above-mentioned autonomous driving vehicle, the vehicle-side condition determination unit may be configured to, when a vehicle speed of the autonomous driving vehicle at a position of the host vehicle in the parking place is greater than the target vehicle speed as instructed from the automated valet parking system according to the position by a vehicle speed determination threshold value or more, determine that the vehicle-side inter-vehicle communication traveling condition is satisfied.

In accordance with each aspect of the present disclosure, it is possible to prevent the inter-vehicle distance between the target vehicles from becoming too close in the parking place.

BRIEF DESCRIPTION OF THE DRAWINGS

FIG. 7C is a diagram for describing another example in which the cancellation condition is satisfied by the completion of the parking of the general vehicle or the like.

DETAILED DESCRIPTION

Hereinafter, an embodiment of the present disclosure will be described with reference to the drawings.

Figure 1:
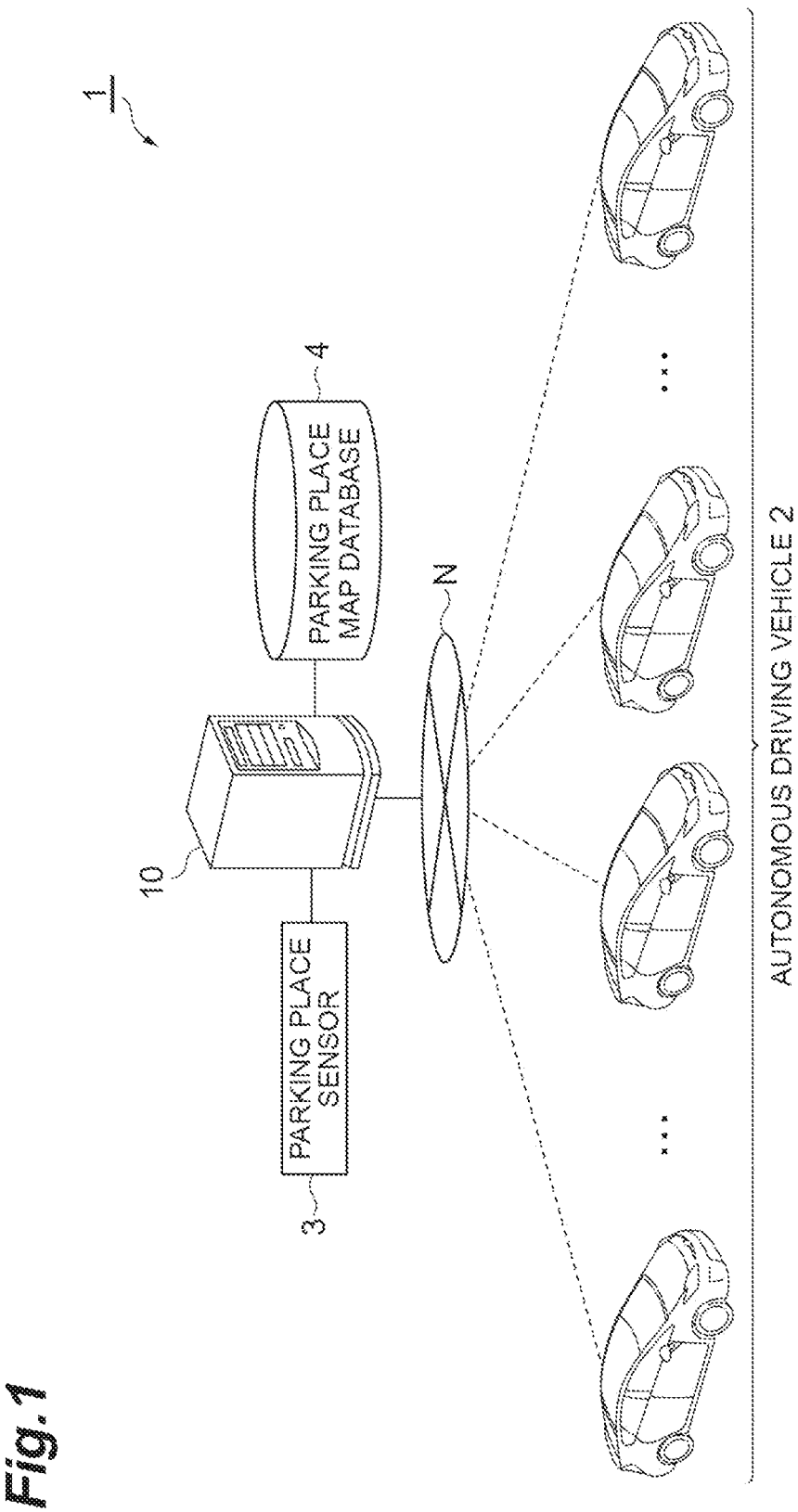
FIG. 1 is a block diagram for describing an automated valet parking system according to an embodiment.

FIG. 1 is a block diagram for describing an automated valet parking system according to the embodiment. An automated valet parking system (AVPS) 1 illustrated in FIG. 1 is a system for performing automated valet parking of a plurality of autonomous driving vehicles 2 in a parking place.

Hereinafter, vehicles that can execute autonomous driving for automated valet parking are referred to as autonomous driving vehicles, vehicles that cannot execute autonomous driving but can execute inter-vehicle communication are referred to as communicative vehicles, and the autonomous driving vehicles and the communicative vehicles are collectively referred to as target vehicles. Vehicles that cannot execute autonomous driving and cannot execute inter-vehicle communication are referred to as general vehicles. A case where the vehicle cannot execute autonomous driving is not limited to a case where a vehicle does not have an autonomous driving function, but also includes a case where a vehicle turns off the autonomous driving function. The same applies to a case where the vehicle cannot execute inter-vehicle communication.

The automated valet parking is a service that allows a driverless autonomous driving vehicle 2, after a user (occupant) has got out of the vehicle at a drop-off area in a parking place, to travel on a target route according to an instruction from the parking place side, and that automatically parks the vehicle in a target parking space in the parking place. The target parking space is a parking space preset as a parking position of the autonomous driving vehicle 2. The target route is a route in the parking place where the autonomous driving vehicle 2 travels to reach the target parking space. The target route at the time of pick-up is a route on which the vehicle travels to reach a pick-up space to be described later.

The parking place may be a parking place dedicated to automated valet parking, or may also serve as a parking place available by the communicative vehicles and the general vehicles. The parking space for automated valet parking and other parking spaces may be separated, and a lane (traveling path) on which the vehicle travels may be shared. In the present embodiment, a parking place available by any of the autonomous driving vehicles 2, the communicative vehicles, and the general vehicles will be described as an example.

Figure 2:
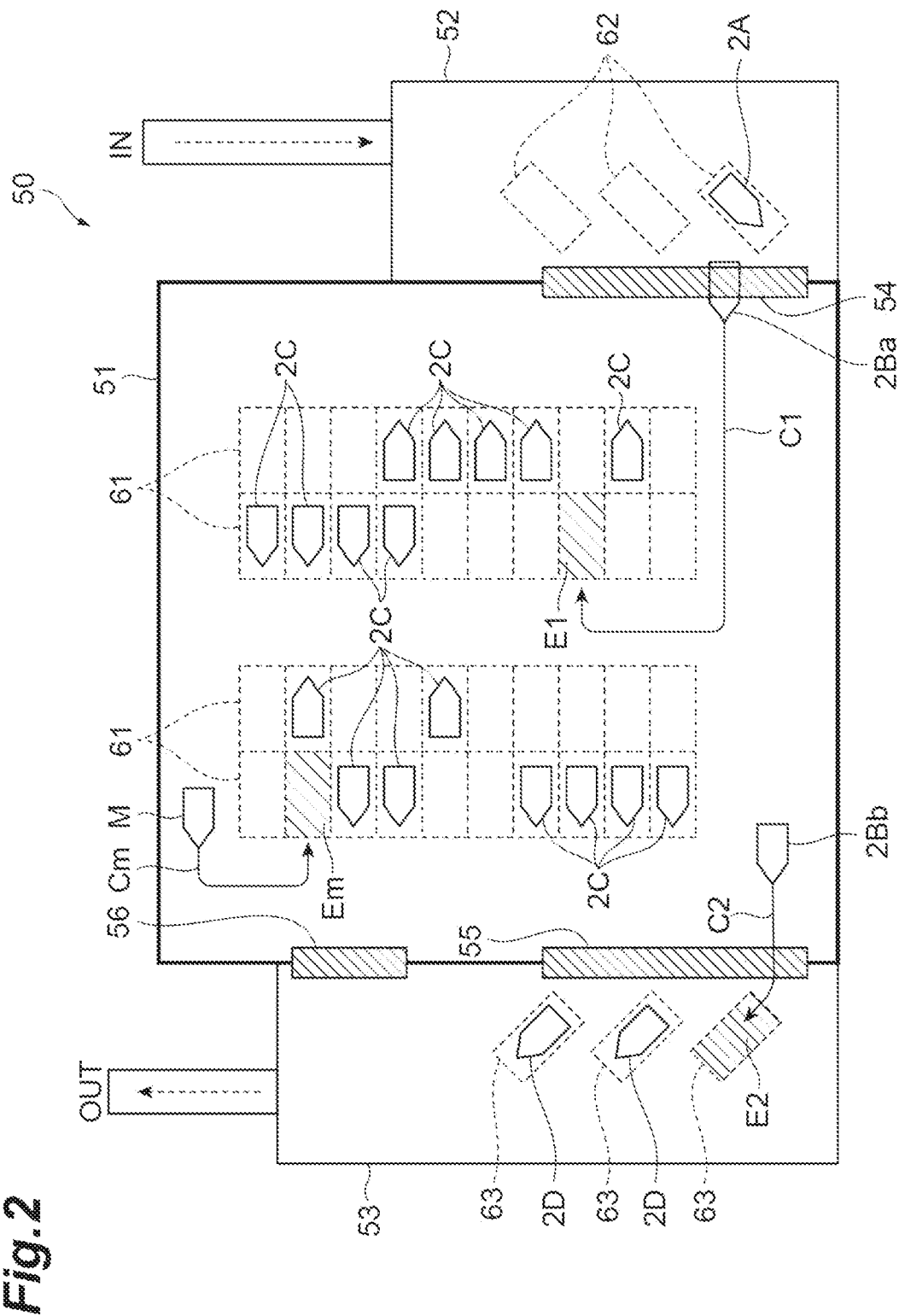
FIG. 2 is a plan view illustrating an example of a parking place where automated valet parking is performed.

Here, FIG. 2 is a plan view illustrating an example of a parking place where automated valet parking is performed. FIG. 2 illustrates a parking place 50, a parking area 51, a drop-off area 52, and a pick-up area 53. The parking place 50 includes the parking area 51, the drop-off area 52, and the pick-up area 53. The drop-off area 52 and the pick-up area 53 do not need to be provided separately, and may be provided as an integrated platform.

The parking area 51 is a place where parking spaces (parking frames) 61 in which the autonomous driving vehicles 2 are parked by the automated valet parking are formed. As illustrated in FIG. 2, for example, a plurality of parking spaces 61 are formed side by side in one direction (for example, a vehicle width direction of a parked vehicle).

The drop-off area 52 is provided near an entrance side of the parking place 50, and is a place where an occupant including a user gets out of the autonomous driving vehicle 2 before entering the parking space. Drop-off spaces 62 for the autonomous driving vehicle 2 to stop when the occupant gets out of the vehicle are formed in the drop-off area 52. The drop-off area 52 leads to the parking area 51 via an entrance gate 54.

The pick-up area 53 is provided near an exit side of the parking place 50, and is a place where the occupant gets on the autonomous driving vehicle 2 that has been picked up.

Pick-up spaces 63 where the autonomous driving vehicle 2 waits for the occupant to get on the vehicle are formed in the pick-up area 53. The pick-up area 53 leads to the parking area 51 via a pick-up gate 55. A return gate 56 for returning the autonomous driving vehicle 2 from the pick-up area 53 to the parking area 51 is provided between the pick-up area 53 and the parking area 51. The return gate 56 is not essential.

In FIG. 2, an autonomous driving vehicle 2A stopped in the drop-off space 62 of the drop-off area 52, autonomous driving vehicles 2Ba and 2Bb traveling in the parking place 50, autonomous driving vehicles 2C parked in the parking spaces 61 of the parking area 51, and autonomous driving vehicles 2D stopped in the pick-up spaces 63 of the pick-up area 53 are illustrated. A communicative vehicle (a vehicle that cannot execute autonomous driving but can execute inter-vehicle communication) M traveling in the parking place is illustrated.

In the automated valet parking system 1, for example, after the autonomous driving vehicle 2 that has entered the parking place 50 drops off the occupant in the drop-off space 62 (corresponding to the autonomous driving vehicle 2A), the automated valet parking is started by obtaining an instruction authority of the autonomous driving vehicle 2. The automated valet parking system 1 causes the autonomous driving vehicle 2Ba to travel along a target route C1, and causes the autonomous driving vehicle 2Ba to park in a target parking space E1. The automated valet parking system 1 causes the autonomous driving vehicle 2Bb that is parked to travel along a target route C2 toward the pick-up area 53 in response to a pick-up request, and causes the autonomous driving vehicle 2Bb to wait for the occupant to arrive in the pick-up space 63 (target parking space E2).

The communicative vehicle M traveling in the parking place is parked not by automated valet parking but by a manual operation of a driver. When the communicative vehicle M can communicate with a parking place control server 10, the communicative vehicle may receive guidance information on a target parking space Em and a target route Cm.

[Configuration of Automated Valet Parking System]

Next, a configuration of the automated valet parking system 1 will be described with reference to the drawings. As illustrated in FIG. 1, the automated valet parking system 1 includes the parking place control server 10. The parking place control server 10 is a server for managing the parking place.

The parking place control server 10 is configured to be able to communicate with the autonomous driving vehicles 2. In some examples, the parking place control server 10 is configured to communicate with the autonomous driving vehicle 2 via a network N. The autonomous driving vehicle 2 will be described in detail later. The parking place control server 10 may be provided in the parking place or may be provided in a facility away from the parking place. The parking place control server 10 may include a plurality of computers provided at different positions. The parking place control server 10 is connected to a parking place sensor 3 and a parking place map database 4.

The parking place sensor 3 is a sensor for recognizing a status in the parking place. The parking place sensor 3 includes, for example, a surveillance camera for detecting a position of the autonomous driving vehicle 2 in the parking place. The surveillance camera is provided on a ceiling or a wall of the parking place, and captures an image of the autonomous driving vehicle 2 in the parking place. The surveillance camera transmits the captured image to the parking place control server 10.

The parking place sensor 3 may include an empty sensor for detecting whether or not there is the parked vehicle in the parking frame (whether the parking frame is occupied or empty). The empty sensor may be provided for each parking frame, or may be provided on a ceiling or the like to be able to monitor a plurality of parking frames by one sensor. The configuration of the empty sensor is not particularly limited, and a known configuration can be employed. The empty sensor may be a pressure sensor, a radar sensor or a sonar sensor using radio waves, or a camera. The empty sensor transmits empty information in the parking frame to the parking place control server 10.

The parking place map database 4 is a database that stores parking place map information. The parking place map information includes positional information of the parking frame in the parking place and information on the traveling path in the parking place. The parking place map information may include positional information of a landmark used for position recognition of the autonomous driving vehicle 2. The landmark includes at least one of a white line, a pole, a safety cone, a pillar of the parking place, and the like.

Figure 3:
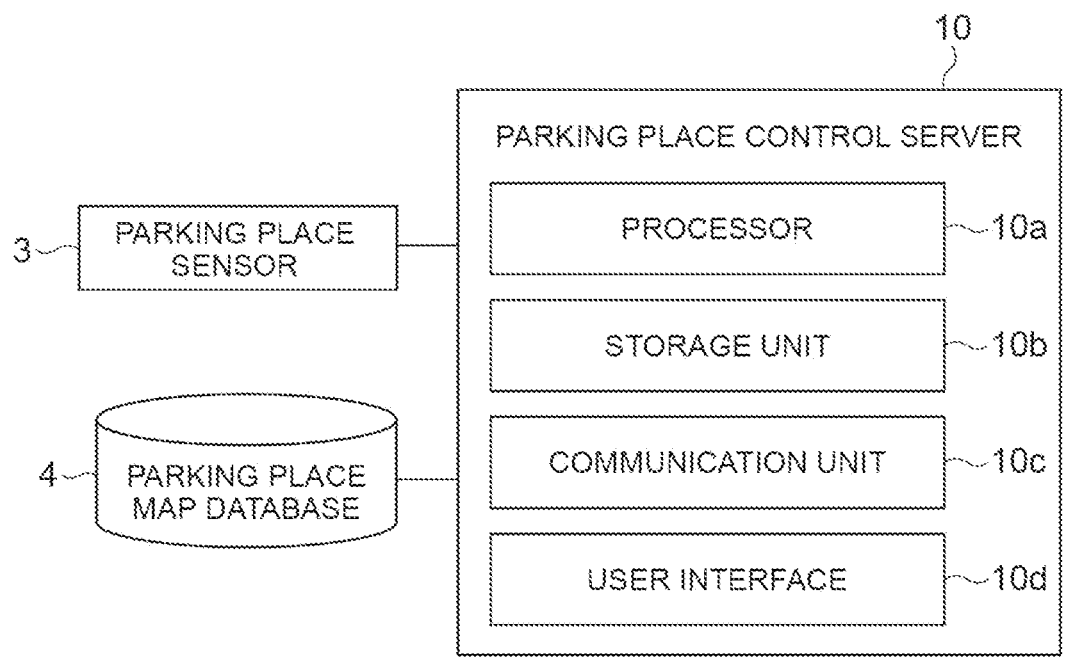
FIG. 3 is a block diagram illustrating an example of a hardware configuration of a parking place control server.

A hardware configuration of the parking place control server 10 will be described. FIG. 3 is a block diagram illustrating an example of the hardware configuration of the parking place control server. As illustrated in FIG. 3, the parking place control server 10 is a general computer that includes a processor 10a, a storage unit 10b, a communication unit 10c, and a user interface 10d.

The processor 10a operates various operating systems to control the parking place control server 10. The processor 10a is an arithmetic logic unit such as a central processing unit (CPU) including a control device, an arithmetic device, a register, and the like. The processor 10a controls the storage unit 10b, the communication unit 10c, and the user interface 10d. The storage unit 10b is, for example, a recording medium including at least one of a read only memory (ROM), a random access memory (RAM), a hard disk drive (HDD), and a solid state drive (SSD).

The communication unit 10c is a communication device for performing wireless communication through a network. As the communication unit 10c, a network device, a network controller, a network card, or the like can be used. The parking place control server 10 communicates with the autonomous driving vehicles 2 by using the communication unit 10c. The user interface 10d is an input and output unit of the parking place control server 10 for an administrator of the parking place control server 10 or the like. The user interface 10d includes an output device such as a display and a speaker, and an input device such as a touch panel.

Figure 4:
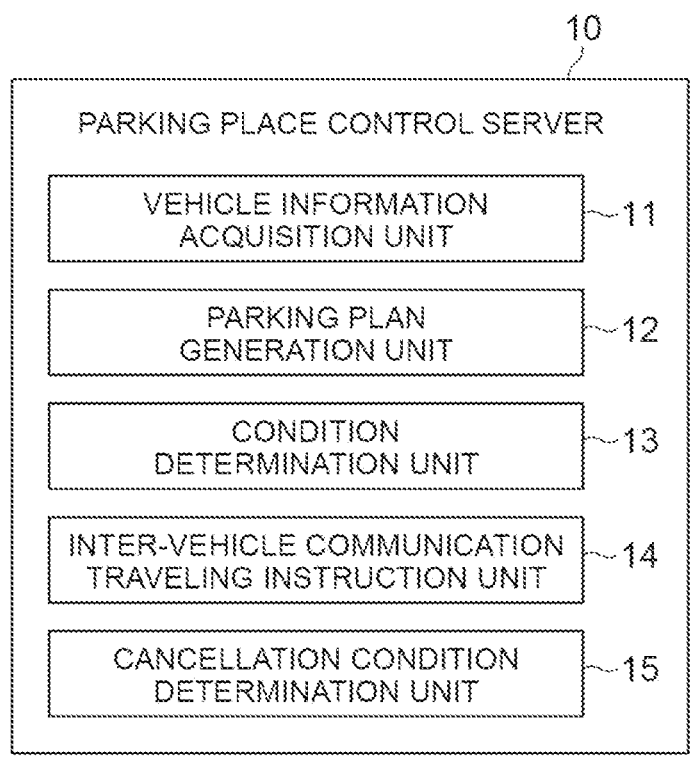
FIG. 4 is a diagram illustrating an example of a functional configuration of the parking place control server.

Next, a functional configuration of the parking place control server 10 will be described. FIG. 4 is a diagram illustrating an example of the functional configuration of the parking place control server 10. As illustrated in FIG. 3, the parking place control server 10 includes a vehicle information acquisition unit 11, a parking plan generation unit 12, a condition determination unit 13, an inter-vehicle communication traveling instruction unit 14, and a cancellation condition determination unit 15.

The vehicle information acquisition unit 11 acquires vehicle information of the autonomous driving vehicle 2 through communication with the autonomous driving vehicle 2 in the parking place. The vehicle information includes identification information of the autonomous driving vehicle 2 and positional information of the autonomous driving vehicle 2 in the parking place. The identification information may be any information as long as information can specify each of the autonomous driving vehicles 2. The identification information may be an identification number (ID number), a vehicle number, a reservation number for automated valet parking, or the like.

The vehicle information may include a type of the autonomous driving vehicle 2 or may include a vehicle number separately from the identification information. The vehicle information may include vehicle entrance reservation information such as a vehicle entrance reservation time, or may include a scheduled pick-up time. The vehicle information may include vehicle body information such as a turning radius, a size, and a vehicle width of the autonomous driving vehicle 2, or may include information regarding the autonomous driving function of the autonomous driving vehicle 2. The information regarding the autonomous driving function may include version information of the autonomous driving function.

The vehicle information may include recognition results of a traveling state of the autonomous driving vehicle 2 and an external environment. The recognition of the traveling state and the external environment will be described later. The vehicle information may include information on the remaining mileage or remaining fuel of the autonomous driving vehicle 2.

The vehicle information acquisition unit 11 continuously acquires the vehicle information from the autonomous driving vehicle 2 during automated valet parking. While the autonomous driving vehicle 2 is parked, the vehicle information acquisition unit 11 may interrupt the acquisition of the vehicle information, or may periodically acquire the vehicle information.

The vehicle information acquisition unit 11 recognizes a status of the autonomous driving vehicle 2 during automated valet parking based on the acquired vehicle information. The status of the autonomous driving vehicle 2 includes the position of the autonomous driving vehicle 2 in the parking place. The status of the autonomous driving vehicle 2 may include a vehicle speed of the autonomous driving vehicle 2, may include a yaw rate of the autonomous driving vehicle 2, and may include a distance between the autonomous driving vehicle 2 and another surrounding vehicle.

The vehicle information acquisition unit 11 acquires positional information of the communicative vehicle and the general vehicle in the parking place. The vehicle information acquisition unit 11 acquires the positional information of the communicative vehicle and the general vehicle based on, for example, the detection result of the parking place sensor 3 (for example, the image recognition result of the camera). The vehicle information acquisition unit 11 may perform position tracking (continuous acquisition of positional information) by, for example, identifying the vehicle by image recognition of a license plate of the vehicle.

A method for acquiring the positional information of the vehicle in the parking place is not particularly limited, and various well-known methods can be employed. The vehicle information acquisition unit 11 may acquire the positional information of each vehicle through communication with a mobile terminal of the driver. When the communicative vehicle M can communicate with the parking place control server 10, host vehicle positional information may be provided to the parking place control server 10 as in the case of the autonomous driving vehicle 2.

The parking plan generation unit 12 generates a parking plan, which is a traveling plan for parking the autonomous driving vehicle 2, based on the vehicle information acquired by the vehicle information acquisition unit 11. The parking plan includes a target parking space in which the autonomous driving vehicle 2 parks and a target route to the target parking space. For example, when a vehicle entrance request is received from the autonomous driving vehicle 2 that has entered the parking place, the parking plan generation unit 12 starts generating the parking plan. The vehicle entrance request may be issued from the user terminal of the occupant instead of the autonomous driving vehicle 2.

The parking plan generation unit 12 sets the target parking space based on an empty status of the parking frame in the parking place recognized from the detection result of the parking place sensor 3. The parking plan generation unit 12 sets a target parking space for a parking frame preset in the parking place. The parking plan generation unit 12 may set an appropriate target parking space corresponding to the size of the autonomous driving vehicle 2 based on the vehicle body information of the autonomous driving vehicle 2.

The parking plan generation unit 12 sets a target route toward the target parking space from a current position of the autonomous driving vehicle 2 based on the positional information of the autonomous driving vehicle 2 acquired by the vehicle information acquisition unit 11, positional information of the target parking space, and the parking place map information of the parking place map database 4.

The parking plan generation unit 12 sets a target route on the traveling path in the parking place. The target route does not necessarily have to be a shortest distance, and a route that does not interfere with or has less interference with a target route of another autonomous driving vehicle 2 may be preferentially selected. A method for setting the target route is not particularly limited, and various well-known methods can be employed.

The parking plan generation unit 12 may generate a vehicle speed plan for the autonomous driving vehicle 2. The parking plan generation unit 12 may control the vehicle speed of the autonomous driving vehicle 2 by calculating a target vehicle speed for each set position preset on the target route (on the traveling path) and reporting positional information of the set position and the vehicle speed plan including the target vehicle speed. For example, the set position is virtually set for the traveling path at regular intervals. The set position may be set at an intersection or a curve of the traveling path. The parking plan generation unit 12 may update the target vehicle speed at the set position based on the traveling statuses of another autonomous driving vehicle 2 and the general vehicle.

Alternatively, the parking plan generation unit 12 may appropriately instruct a target vehicle speed corresponding to a change in the position of the autonomous driving vehicle 2 without generating the vehicle speed plan. The parking plan generation unit 12 may instruct an upper limit of the vehicle speed to the autonomous driving vehicle 2, and may cause the autonomous driving vehicle 2 to adjust the vehicle speed.

The condition determination unit 13 determines whether or not the target vehicles satisfy an inter-vehicle communication traveling condition based on the positional information of the target vehicles in the parking place acquired by the vehicle information acquisition unit 11. The inter-vehicle communication traveling condition is a condition preset for determining the necessity of inter-vehicle communication traveling which will be described later.

When the number of a plurality of target vehicles in the same lane in the parking place is equal to or greater than a lane number threshold value, the condition determination unit 13 may determine that the plurality of target vehicles traveling in the same lane satisfy the inter-vehicle communication traveling condition. The condition determination unit 13 may determine whether the lanes are the same while referring to the parking place map information. The identity of the lanes can be set voluntarily. The identity of the lanes may be distinguished as individual lanes with intersections as boundaries, or may be set as one lane that straddles a plurality of intersections.

The lane number threshold value is a threshold value preset for determining the inter-vehicle communication traveling condition. The lane number threshold value may be a constant value, or may be a value set according to a length of the lane. For example, the lane number threshold value may be set as a larger value as the lane length becomes longer. The lane number threshold value may be set as a larger value as the number of lanes connected in the middle becomes larger. The lane number threshold value may be set to a smaller value when there is a curve in the middle of the lane than when the lane is a straight path.

The number of target vehicles in a set area preset in the parking place may be used instead of the lane. When the number of target vehicles in the set area is equal to or greater than an area number threshold value, the condition determination unit 13 may determine that the target vehicles in the set area satisfy the inter-vehicle communication traveling condition. The area number threshold value is a threshold value of a preset value. The area number threshold value may be set as a larger value as an area of the set area becomes wider.

Figure 5A:
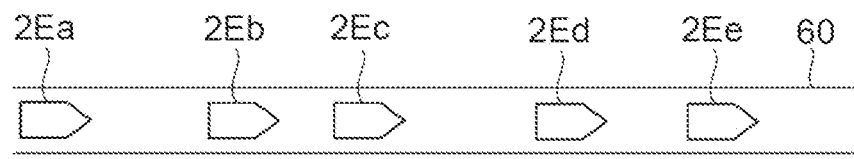
FIG. 5A is a diagram for describing an example in which an inter-vehicle communication traveling condition is satisfied by the number of vehicles in the same lane.

FIG. 5A is a diagram for describing an example in which the inter-vehicle communication traveling condition is satisfied by the number of vehicles in the same lane. FIG. 5A illustrates a lane 60 and five autonomous driving vehicles 2Ea to 2Ee in the parking place. Here, it is assumed that the lane number threshold value is set to 5. In this case, the five autonomous driving vehicles 2Ea to 2Ee have variations in an inter-vehicle distance even though the same target vehicle speed is given due to a difference in acceleration performance, deceleration performance, or accuracy of vehicle speed control.

In the status illustrated in FIG. 5A, since the number of autonomous driving vehicles 2Ea to 2Ee which are the target vehicles is five (lane number threshold value) or more, the condition determination unit 13 determines that the autonomous driving vehicles 2Ea to 2Ee satisfy the inter-vehicle communication traveling condition. The communicative vehicle may be included in the autonomous driving vehicles 2Ea to 2Ee.

When there are a plurality of target vehicles between which an inter-vehicle distance is less than an inter-vehicle distance threshold value, the condition determination unit 13 may determine that the plurality of target vehicles between which the inter-vehicle distance is less than the inter-vehicle distance threshold value satisfy the inter-vehicle communication traveling condition. The inter-vehicle distance threshold value is a threshold value of a preset value for determining the inter-vehicle communication traveling condition.

Figure 5B:
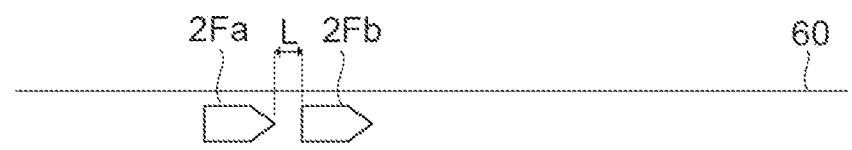
FIG. 5B is a diagram for describing an example in which the inter-vehicle communication traveling condition is satisfied by an inter-vehicle distance.

FIG. 5B is a diagram for describing an example in which the inter-vehicle communication traveling condition is satisfied by the inter-vehicle distance. FIG. 5B illustrates an autonomous driving vehicle 2Fa, an autonomous driving vehicle 2Fb, and an inter-vehicle distance L between the autonomous driving vehicles 2Fa and 2Fb.

In the status illustrated in FIG. 5A, since the inter-vehicle distance L between the autonomous driving vehicle 2Fa and the autonomous driving vehicle 2Fb is less than the inter-vehicle distance threshold value, the condition determination unit 13 determines that the autonomous driving vehicle 2Fa and the autonomous driving vehicle 2Fb satisfy the inter-vehicle communication traveling condition. One of the autonomous driving vehicle 2Fa and the autonomous driving vehicle 2Fb may be the communicative vehicle.

Whether or not the inter-vehicle communication traveling condition based on the inter-vehicle distance is satisfied may be determined in the autonomous driving vehicle 2Fa and the autonomous driving vehicle 2Fb. The automated valet parking system 1 may allow the autonomous driving vehicle 2 as a target of the automated valet parking to perform inter-vehicle communication traveling when the inter-vehicle communication traveling condition is satisfied in advance. The inter-vehicle communication traveling will be described later.

When there are the plurality of target vehicles positioned on a lane in which the general vehicle travels in the parking place, the condition determination unit 13 may determine that the plurality of target vehicles in the lane satisfy the inter-vehicle communication traveling condition. The identity of the lanes can be set voluntarily. The condition determination unit 13 may refer to the parking place map information.

Figure 5C:
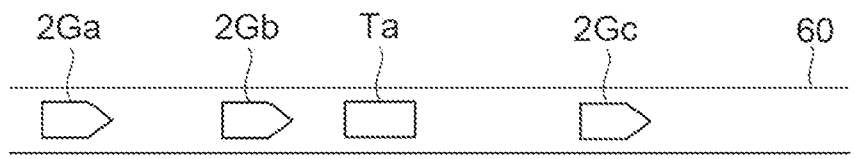
FIG. 5C is a diagram for describing an example in which the inter-vehicle communication traveling condition is satisfied by traveling in the same lane as a general vehicle.

FIG. 5C is a diagram for describing an example in which the inter-vehicle communication traveling condition is satisfied by traveling in the same lane as the general vehicle. FIG. 5C illustrates a general vehicle Ta and autonomous driving vehicles 2Ga to 2Gc. The general vehicle Ta and the autonomous driving vehicles 2Ga to 2Gc are traveling in the same lane 60.

In the status illustrated in FIG. 5C, the condition determination unit 13 determines that the autonomous driving vehicles 2Ga to 2Gc positioned in the lane in which the general vehicle Ta travels satisfy the inter-vehicle communication traveling condition. The communicative vehicle may be included in the autonomous driving vehicles 2Ga to 2Gc.

When the general vehicle enters the set area preset in the parking place, the condition determination unit 13 may determine that the plurality of target vehicles in the set area satisfy the inter-vehicle communication traveling condition. The set area is not particularly limited. The set area may be set for the entire parking place, or may be set only for the parking area 51 illustrated in FIG. 2. The set area may be set for the lane. The condition determination unit 13 refers to the parking place map information in which the set area is set.

Figure 5D:
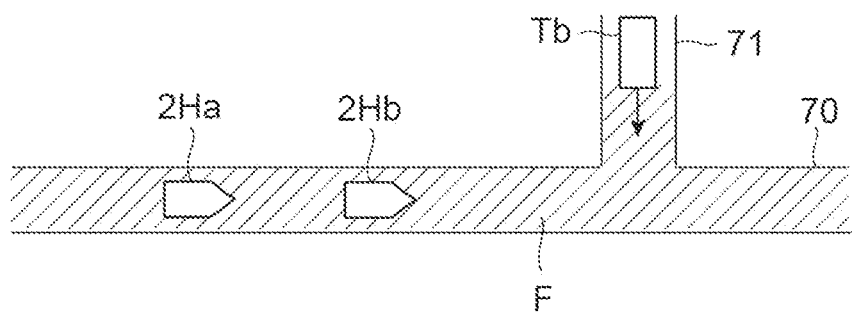
FIG. 5D is a diagram for describing an example in which the inter-vehicle communication traveling condition is satisfied by entering a set area of the general vehicle.

FIG. 5D is a diagram for describing an example in which the inter-vehicle communication traveling condition is satisfied by entering the set area of the general vehicle. FIG. 5D illustrates a lane 70, a merging lane 71, a set area F, a general vehicle Tb, and autonomous driving vehicles 2Ha and 2Hb. The merging lane 71 merges in the middle of the lane 70 to form a T-junction. The autonomous driving vehicles 2Ha and 2Hb are traveling in the lane 70 toward an intersection, and the general vehicle Tb traveling in the merging lane 71 is about to appear in front of the autonomous driving vehicles 2Ha and 2Hb. As an example, the set area F includes the entire lane 70 and an area of the merging lane 71 at a certain distance from the intersection of the lane 70.

In the status illustrated in FIG. 5D, the condition determination unit 13 determines that the autonomous driving vehicle 2Ha and the autonomous driving vehicle 2Hb in the set area F satisfy the inter-vehicle communication traveling condition. One of the autonomous driving vehicle 2Ha and the autonomous driving vehicle 2Hb may be the communicative vehicle.

The inter-vehicle communication traveling instruction unit 14 causes the target vehicles determined to satisfy the inter-vehicle communication traveling condition by the condition determination unit 13 to perform inter-vehicle communication traveling by inter-vehicle communication. The inter-vehicle communication traveling is traveling control for controlling the vehicle speed according to the traveling state (acceleration, deceleration, or the like) of another vehicle acquired by using the inter-vehicle communication. The communicative vehicle in which the driver is manually driving may not perform the inter-vehicle communication traveling. When there is no other target vehicle capable of executing the inter-vehicle communication around the target vehicles, the inter-vehicle communication traveling may be instructed as a reservation.

The inter-vehicle communication traveling instruction unit 14 instructs the autonomous driving vehicle 2 to perform the inter-vehicle communication traveling by communication. The autonomous driving vehicle 2 executes the inter-vehicle communication traveling by connecting inter-vehicle communication with surrounding target vehicles. The inter-vehicle communication traveling instruction unit 14 may instruct a connection target of the inter-vehicle communication for each autonomous driving vehicle 2. The target vehicle within a certain distance from the autonomous driving vehicle 2 that has satisfied the inter-vehicle communication traveling condition may be reported as the connection target of the inter-vehicle communication, and only the target vehicles before and after the autonomous driving vehicle 2 that satisfies the inter-vehicle communication traveling condition are reported as the connection target of the inter-vehicle communication. The inter-vehicle communication traveling instruction unit 14 may cause the autonomous driving vehicle 2 to determine the connection target of the inter-vehicle communication.

When the communicative vehicle that has satisfied the inter-vehicle communication traveling condition can communicate with the parking place control server 10, the inter-vehicle communication traveling instruction unit 14 may instruct the communicative vehicle to perform the inter-vehicle communication traveling (request connection of the inter-vehicle communication) by communication. When the communicative vehicle cannot communicate with the parking place control server 10, the inter-vehicle communication traveling instruction unit 14 may instruct the inter-vehicle communication traveling via the autonomous driving vehicle 2.

Figure 6A:
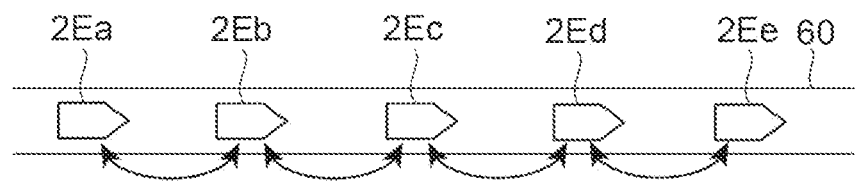
FIG. 6A is a diagram for describing an example in which inter-vehicle communication traveling is executed according to the number of vehicles in the same lane.

FIG. 6A is a diagram for describing an example in which the inter-vehicle communication traveling is executed according to the number of vehicles in the same lane. As illustrated in FIG. 6A, the autonomous driving vehicles 2Ea to 2Ee traveling in the same lane perform the inter-vehicle communication traveling, and thus, the inter-vehicle communication traveling instruction unit 14 can appropriately maintain the inter-vehicle distance by preventing the inter-vehicle distance from becoming too close even though there is a difference in acceleration performance, deceleration performance, or accuracy of vehicle speed control.

Figure 6B:
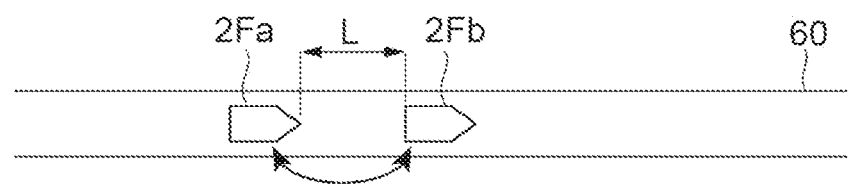
FIG. 6B is a diagram for describing an example in which the inter-vehicle communication traveling is executed according to the inter-vehicle distance.

FIG. 6B is a diagram for describing an example in which the inter-vehicle communication traveling is executed according to the inter-vehicle distance. As illustrated in FIG. 6B, the autonomous driving vehicle 2Fa and the autonomous driving vehicle 2Fb between which the inter-vehicle distance is close due to the difference in acceleration performance, deceleration performance, or accuracy of vehicle speed control are caused to perform the inter-vehicle communication traveling, and thus, the inter-vehicle communication traveling instruction unit 14 can appropriately maintain the inter-vehicle distance by preventing the inter-vehicle distance from becoming too close.

Figure 6C:
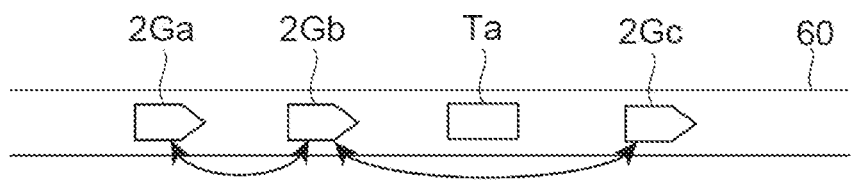
FIG. 6C is a diagram for describing an example in which the inter-vehicle communication traveling is executed by traveling in the same lane as the general vehicle.

FIG. 6C is a diagram for describing an example in which the inter-vehicle communication traveling is executed by traveling in the same lane as the general vehicle. As illustrated in FIG. 6C, the autonomous driving vehicles 2Ga to 2Gc positioned in the lane in which the general vehicle Ta travels are caused to perform the inter-vehicle communication traveling, and thus, the inter-vehicle communication traveling instruction unit 14 can prevent the inter-vehicle distance between the autonomous driving vehicle 2Ga and the autonomous driving vehicle 2Gb from becoming too close even though the autonomous driving vehicle 2Gb suddenly decelerates due to a behavior of the general vehicle Ta. The inter-vehicle communication traveling instruction unit 14 may determine that only the target vehicle traveling behind the general vehicle satisfies the inter-vehicle communication traveling condition.

Figure 6D:
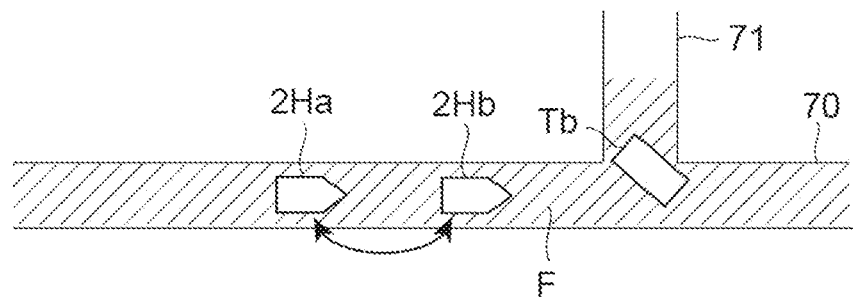
FIG. 6D is a diagram for describing an example in which the inter-vehicle communication traveling is executed by entering the set area of the general vehicle.

FIG. 6D is a diagram for describing an example in which the inter-vehicle communication traveling is executed by entering the set area of the general vehicle. As illustrated in FIG. 6D, the autonomous driving vehicle 2Ha and the autonomous driving vehicle 2Hb traveling in the set area F that the general vehicle Tb has entered are caused to perform the inter-vehicle communication traveling, and thus, the inter-vehicle communication traveling instruction unit 14 can prevent the inter-vehicle distance between the autonomous driving vehicle 2Ha and the autonomous driving vehicle 2Hb from becoming too close even though the autonomous driving vehicle 2Ha suddenly decelerates due to the entrance of the general vehicle Tb.

After the inter-vehicle communication traveling is instructed, the inter-vehicle communication traveling instruction unit 14 instructs the end of the inter-vehicle communication traveling when the cancellation condition determination unit 15 to be described later determines that a cancellation condition is satisfied.

The inter-vehicle communication traveling instruction unit 14 may issue a retreat instruction of the autonomous driving vehicle 2 according to the presence of the general vehicle. The autonomous driving vehicle retreats while using inter-vehicle communication, and thus, it is possible to maintain an appropriate inter-vehicle distance even during retreating. The inter-vehicle communication traveling instruction unit 14 may stop the autonomous driving vehicle 2 closer to a road shoulder such that the general vehicle can go first. The inter-vehicle communication traveling instruction unit 14 restarts the traveling of the autonomous driving vehicle 2 that has been retreated or stopped, for example, when the general vehicle is separated by a certain distance or more. The inter-vehicle communication traveling instruction unit 14 may provide route guidance and vehicle speed upper limit guidance to the general vehicle when the general vehicle or the mobile terminal of the driver of the general vehicle can communicate with the parking place control server 10.

When there is the target vehicle for performing the inter-vehicle communication traveling, the cancellation condition determination unit 15 determines whether or not the target vehicle satisfies the cancellation condition based on the positional information of the target vehicle in the parking place acquired by the vehicle information acquisition unit 11. The cancellation condition is a condition preset for determining whether or not to cancel the inter-vehicle communication traveling. As the cancellation condition, a condition corresponding to the inter-vehicle communication traveling condition in which the inter-vehicle communication traveling is started may be selectively applied from a plurality of conditions.

For example, the number of target vehicles in the same lane is equal to or greater than the lane number threshold value, and thus, the inter-vehicle communication traveling condition is satisfied. In this case, the cancellation condition determination unit 15 determines that the cancellation condition of the target vehicle in the lane is satisfied when the number of target vehicles in the lane is less than a lane number cancellation threshold value. The lane number cancellation threshold value is a threshold value of a preset value for determining the end of the inter-vehicle communication traveling. The lane number cancellation threshold value may be the same value as the lane number threshold value in the inter-vehicle communication traveling condition, or may be a value smaller than the lane number threshold value.

Figure 7A:
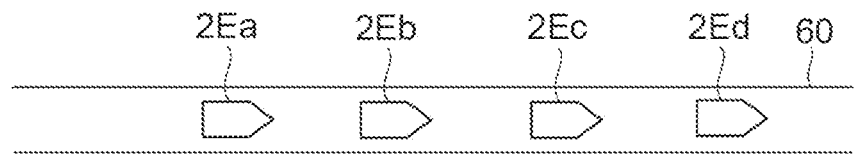
FIG. 7A is a diagram for describing an example in which a cancellation condition by the number of vehicles in the same lane is satisfied.

FIG. 7A is a diagram for describing an example in which the cancellation condition by the number of vehicles in the same lane is satisfied. In this case, it is assumed that the lane number cancellation threshold value is five. In FIG. 7A, the autonomous driving vehicle 2Ee in FIG. 6A is out of the lane due to the completion of parking.

In the status illustrated in FIG. 7A, when the number of target vehicles in the lane 60 (autonomous driving vehicle 2Ea to autonomous driving vehicle 2Ed) is less than the lane number cancellation threshold value, the cancellation condition determination unit 15 determines that the cancellation condition of the autonomous driving vehicle 2Ea to the autonomous driving vehicle 2Ed is satisfied.

The number of target vehicles in a set area preset in the parking place may be used instead of the lane. When the number of target vehicles in the set area is less than an area number cancellation threshold value, the cancellation condition determination unit 15 may determine that the target vehicle in the set area satisfies the cancellation condition. The area number cancellation threshold value is a threshold value of a preset value. The area number cancellation threshold value may be the same value as the area number threshold value in the inter-vehicle communication traveling condition, or may be a value smaller than the area number threshold value.

The cancellation condition determination unit 15 determines that the cancellation condition of the target vehicle is satisfied when the inter-vehicle communication traveling condition is satisfied due to the presence of the general vehicle and the general vehicle disappears due to the completion of parking or the like.

Figure 7B:
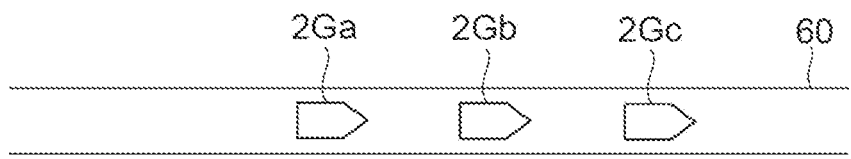
FIG. 7B is a diagram for describing an example in which the cancellation condition is satisfied by the completion of parking of the general vehicle.

FIG. 7B is a diagram for describing an example in which the cancellation condition is satisfied due to the completion of parking of the general vehicle or the like. In the status illustrated in FIG. 7B, since the general vehicle Ta which is a factor that satisfies the inter-vehicle communication traveling condition is out of the lane, the cancellation condition determination unit 15 determines that the cancellation condition of the autonomous driving vehicles 2Ga to 2Gc is satisfied. Accordingly, since the vehicle speed is controlled according to the target vehicle speed instructed by the automated valet parking system 1, the autonomous driving vehicles 2Ga to 2Gc can improve the usage efficiency of the entire parking place. The inter-vehicle communication traveling is also ended when the parking is completed.

Figure 7C:
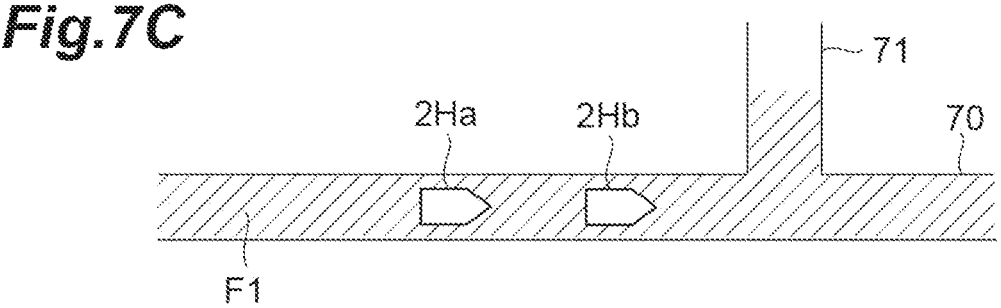

FIG. 7C is a diagram for describing another example in which the cancellation condition is satisfied due to the completion of parking of the general vehicle or the like. In the status illustrated in FIG. 7B, since the traveling general vehicle Tb which is a factor that satisfies the inter-vehicle communication traveling condition is no longer present in the set area (is not traveling in the set area), the cancellation condition determination unit 15 determines that the cancellation condition of the autonomous driving vehicles 2Ha and 2Hb is satisfied.

[Control Method of Automated Valet Parking System]

Figure 8A:
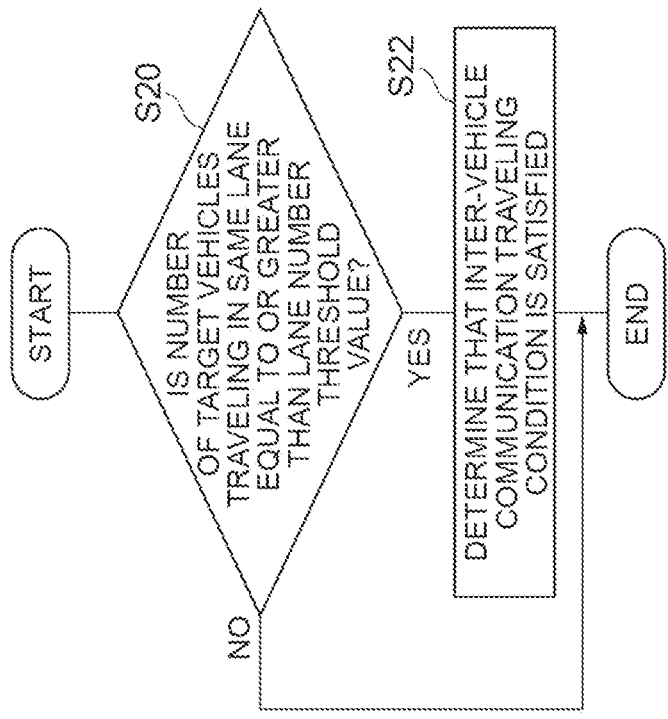
FIG. 8A is a flowchart illustrating an example of inter-vehicle communication traveling processing.

Next, an example of a control method (processing) of the automated valet parking system 1 according to the present embodiment will be described. FIG. 8A is a flowchart illustrating an example of inter-vehicle communication traveling processing. The inter-vehicle communication traveling processing is executed when there is the autonomous driving vehicle 2 in the automated valet parking.

As illustrated in FIG. 8A, the parking place control server 10 of the automated valet parking system 1 acquires the positional information (vehicle information) of the target vehicle in the parking place by the vehicle information acquisition unit 11 in S10 (vehicle information acquisition step).

In S12, the parking place control server 10 determines whether or not the inter-vehicle communication traveling condition of the target vehicle is satisfied by the condition determination unit 13 (condition determination step). The condition determination unit 13 performs the above determination based on the positional information of the target vehicle in the parking place which is acquired by the vehicle information acquisition unit 11.

When it is determined that the inter-vehicle communication traveling condition of the target vehicle is satisfied (S12: YES), the parking place control server 10 shifts to S14. When it is not determined that the inter-vehicle communication traveling condition of the target vehicle is satisfied (S12: NO), the parking place control server 10 ends the current processing. Thereafter, the parking place control server 10 repeats the determination from S10 again.

In S14, the parking place control server 10 instructs the target vehicle that has satisfied the inter-vehicle communication traveling condition to perform the inter-vehicle communication traveling by the inter-vehicle communication traveling instruction unit 14 (inter-vehicle communication traveling instruction step). The target vehicle executes the inter-vehicle communication traveling by connecting inter-vehicle communication with surrounding target vehicles.

Figure 8B:
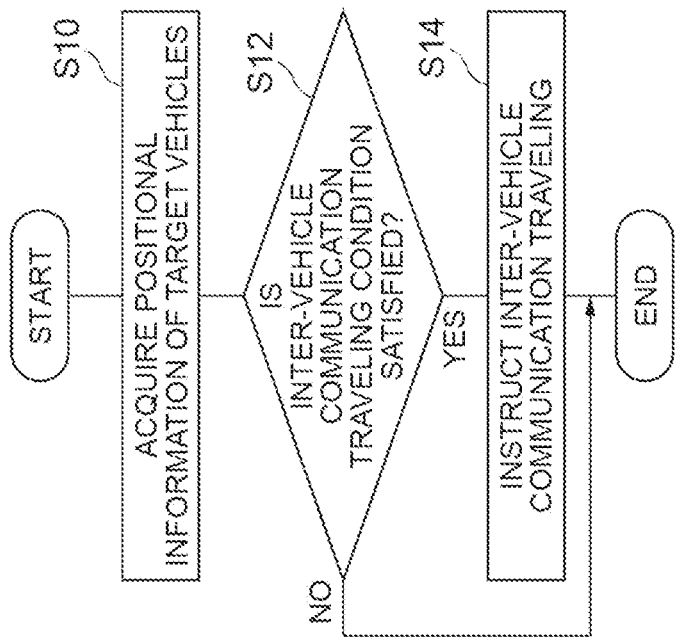
FIG. 8B is a flowchart illustrating an example of inter-vehicle communication traveling condition determination processing by the number of vehicles in the same lane.

Subsequently, a specific example of the inter-vehicle communication traveling condition determination processing (condition determination step) corresponding to S12 in FIG. 8A will be described. FIG. 8B is a flowchart illustrating an example of the inter-vehicle communication traveling condition determination processing based on the number of vehicles in the same lane.

As illustrated in FIG. 8B, the parking place control server 10 determines whether or not the number of the plurality of target vehicles in the same lane in the parking place is equal to or greater than the lane number threshold value by the condition determination unit 13 in S20 (lane number determination step).

When it is determined that the number of the plurality of target vehicles in the same lane is equal to or greater than the lane number threshold value (S20: YES), the parking place control server 10 shifts to S22. When it is not determined that the number of the plurality of target vehicles in the same lane is equal to or greater than the lane number threshold value (S20: NO), the parking place control server 10 ends the current processing. In S22, the parking place control server 10 determines that the inter-vehicle communication traveling condition is satisfied by the condition determination unit 13.

Figure 9A:
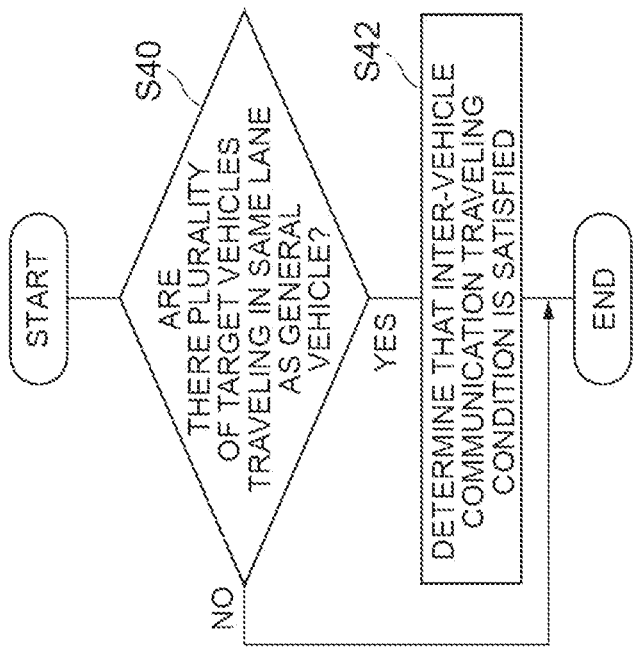
FIG. 9A is a flowchart illustrating an example of the inter-vehicle communication traveling condition determination processing based on the inter-vehicle distance.

FIG. 9A is a flowchart illustrating an example of the inter-vehicle communication traveling condition determination processing based on the inter-vehicle distance. As illustrated in FIG. 9A, the parking place control server 10 determines whether or not there are the plurality of target vehicles between which the inter-vehicle distance is less than the inter-vehicle distance threshold value in S30 (inter-vehicle distance determination step).

When it is determined that there are the plurality of target vehicles between which the inter-vehicle distance is less than the inter-vehicle distance threshold value (S30: YES), the parking place control server 10 shifts to S32. When it is not determined that there are the plurality of target vehicles between which the inter-vehicle distance is less than the inter-vehicle distance threshold value, the parking place control server 10 ends the current processing (S30: NO). In S32, the parking place control server 10 determines that the inter-vehicle communication traveling condition is satisfied by the condition determination unit 13.

Figure 9B:
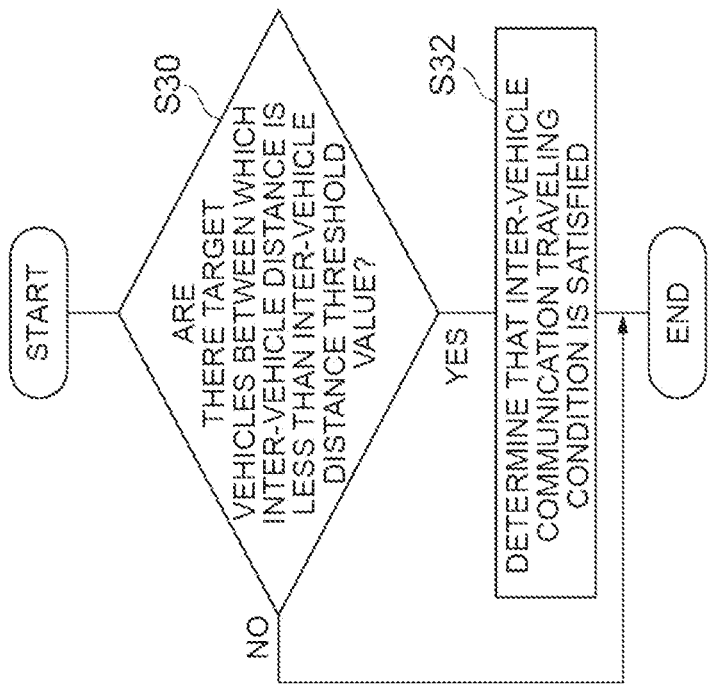
FIG. 9B is a flowchart illustrating an example of the inter-vehicle communication traveling condition determination processing by traveling in the same lane as the general vehicle.

FIG. 9B is a flowchart illustrating an example of the inter-vehicle communication traveling condition determination processing by traveling in the same lane as the general vehicle. As illustrated in FIG. 9B, the parking place control server 10 determines whether or not there are the plurality of target vehicles positioned in the lane in which the general vehicle travels in the parking place in S40 (general vehicle lane determination step).

When it is determined that there are the plurality of target vehicles positioned in the lane in which the general vehicle travels in the parking place (S40: YES), the parking place control server 10 shifts to S42. When it is not determined that there are the plurality of target vehicles positioned in the lane in which the general vehicle travels in the parking place, the parking place control server 10 ends the current processing (S40: NO). In S42, the parking place control server 10 determines that the inter-vehicle communication traveling condition is satisfied by the condition determination unit 13.

Figure 10:
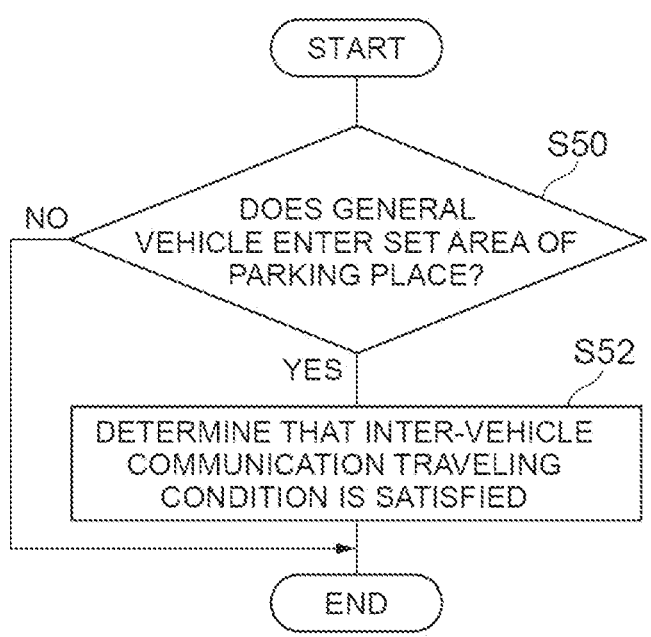
FIG. 10 is a flowchart illustrating an example of the inter-vehicle communication traveling condition determination processing by entering the set area of the general vehicle.

FIG. 10 is a flowchart illustrating an example of the inter-vehicle communication traveling condition determination processing by entering the set area of the general vehicle. As illustrated in FIG. 10, the parking place control server 10 determines whether or not the general vehicle enters the set area of the parking place in S50 (general vehicle entrance determination step).

When it is determined that the general vehicle enters the set area of the parking place (S50: YES), the parking place control server 10 shifts to S52. When it is not determined that a general vehicle has entered the set area of the parking place, the parking place control server 10 ends the current processing (S50: NO). In S52, the parking place control server 10 determines that the inter-vehicle communication traveling condition is satisfied by the condition determination unit 13.

Figure 11B:
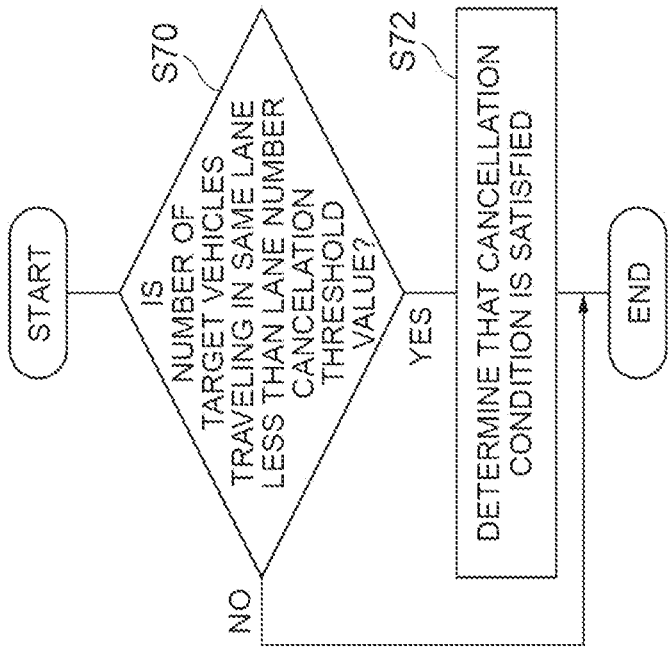
FIG. 11B is a flowchart illustrating an example of cancellation condition determination processing by the number of vehicles in the same lane.
Figure 11A:
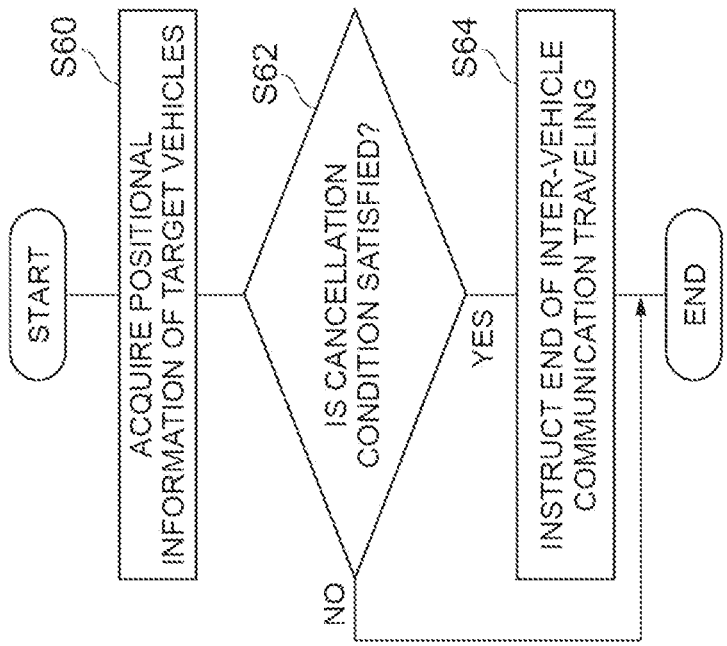
FIG. 11A is a flowchart illustrating an example of inter-vehicle communication traveling cancellation processing.

Next, inter-vehicle communication traveling cancellation processing in the automated valet parking system 1 will be described. FIG. 11A is a flowchart illustrating an example of the inter-vehicle communication traveling cancellation processing. The inter-vehicle communication traveling cancellation processing is executed, for example, when there is the target vehicle that is performing the inter-vehicle communication traveling.

As illustrated in FIG. 11A, the parking place control server 10 acquires the positional information (vehicle information) of the target vehicle in the parking place by the vehicle information acquisition unit 11 in S60 (vehicle information acquisition step).

In S62, the parking place control server 10 determines whether or not the cancellation condition of the target vehicle that is performing the inter-vehicle communication traveling is satisfied by the cancellation condition determination unit 15 (cancellation condition determination step). The cancellation condition determination unit 15 performs the above determination based on the positional information of the target vehicle in the parking place which is acquired by the vehicle information acquisition unit 11.

When it is determined that the cancellation condition of the target vehicle is satisfied (S62: YES), the parking place control server 10 shifts to S64. When it is not determined that the cancellation condition of the target vehicle is satisfied (S62: NO), the parking place control server 10 ends the current processing. Thereafter, the parking place control server 10 repeats the processing from S60 again. In S64, the parking place control server 10 instructs the target vehicle for which the cancellation condition is satisfied to end the inter-vehicle communication traveling by the inter-vehicle communication traveling instruction unit 14 (inter-vehicle communication traveling end step).

A specific example of the cancellation condition determination processing (cancellation condition determination step) corresponding to S62 in FIG. 11A will be described. FIG. 11B is a flowchart illustrating an example of the cancellation condition determination processing based on the number of vehicles in the same lane.

As illustrated in FIG. 11A, the parking place control server 10 determines whether or not the number of the plurality of target vehicles in the same lane in the parking place is less than the lane number cancellation threshold value by the cancellation condition determination unit 15 in S70 (lane number cancellation determination step).

When it is determined that the number of the plurality of target vehicles in the same lane is less than the lane number cancellation threshold value (S70: YES), the parking place control server 10 shifts to S72. When it is not determined that the number of the plurality of target vehicles in the same lane is less than the lane number cancellation threshold value (S70: NO), the parking place control server 10 ends the current processing. In S72, the parking place control server 10 determines that the cancellation condition of the target vehicle is satisfied by the cancellation condition determination unit 15.

In accordance with the automated valet parking system 1 according to the present embodiment described above, the target vehicle determined to satisfy the inter-vehicle communication traveling condition is caused to perform the inter-vehicle communication traveling by the inter-vehicle communication, and thus, the inter-vehicle distance between the target vehicles including the autonomous driving vehicle and the communicative vehicle can be appropriately maintained as compared with a case where the inter-vehicle communication traveling is not performed.

In accordance with the automated valet parking system 1, since the autonomous driving vehicle 2 is instructed to preferentially perform vehicle speed adjustment for vehicle approach suppression by inter-vehicle communication over the target vehicle speed for automated valet parking, it is possible to prevent the inter-vehicle distance between the autonomous driving vehicles 2 from becoming too close as compared with a case where only the instruction of the target vehicle speed is issued to the plurality of autonomous driving vehicles 2 of which acceleration performance, deceleration performance, or accuracy of vehicle speed control is different.

In accordance with the automated valet parking system 1, when the number of the plurality of target vehicles in the same lane in the parking place is equal to or greater than the lane number threshold value, the target vehicles are caused to perform the inter-vehicle communication traveling, and thus, it is possible to prevent the inter-vehicle distance between the plurality of target vehicles in the lane from becoming too close. Similarly, in the automated valet parking system 1, the plurality of target vehicles between which the inter-vehicle distance is less than the inter-vehicle distance threshold value are caused to perform the inter-vehicle communication traveling, and thus, it is possible to prevent the plurality of target vehicles from becoming too close.

In accordance with the automated valet parking system 1, the plurality of target vehicles positioned in the lane in which the general vehicle travels in the parking place are caused to perform the inter-vehicle communication traveling, and thus, it is possible to prevent the inter-vehicle distance between the plurality of target vehicles from becoming too close even though the target vehicle that performs the inter-vehicle communication traveling suddenly decelerates due to the presence of the general vehicle. Similarly, in accordance with the automated valet parking system 1, when the general vehicle enters the set area, the plurality of target vehicles in the set area are caused to perform the inter-vehicle communication traveling, and thus, it is possible to prevent the inter-vehicle distance between the plurality of target vehicles from becoming too close even though the target vehicle that performs the inter-vehicle communication traveling suddenly decelerates due to the presence of the general vehicle.

In accordance with the automated valet parking system, since the inter-vehicle communication traveling of the target vehicle determined to satisfy the cancellation condition by the cancellation condition determination unit 15 is ended, it is possible to improve the usage efficiency of the parking place by controlling the vehicle speed of the autonomous driving vehicle according to the target vehicle speed for automated valet parking.

[Configuration of Autonomous Driving Vehicle]

Figure 12:
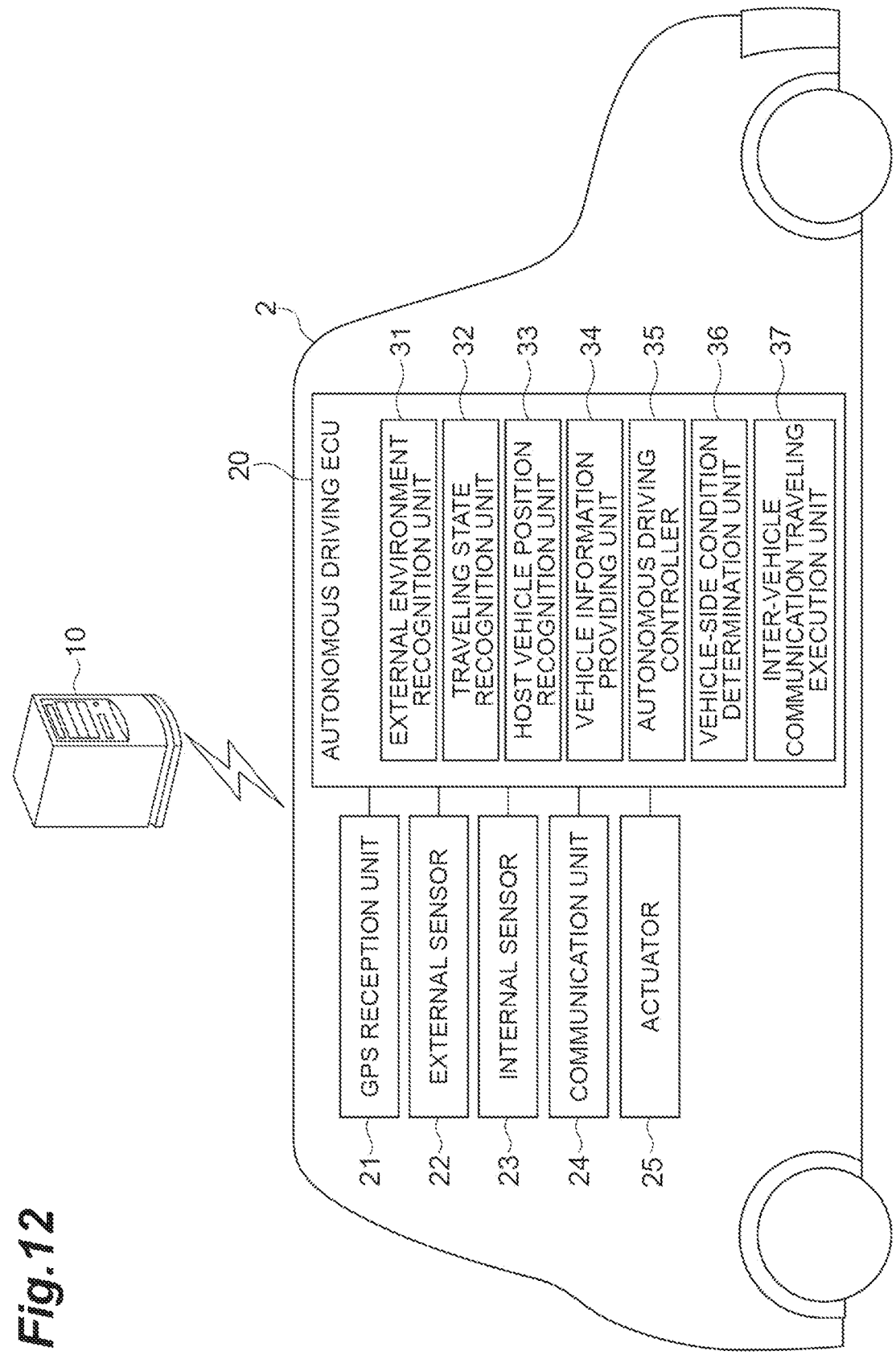
FIG. 12 is a block diagram illustrating an example of an autonomous driving vehicle.

Next, an example of a configuration of the autonomous driving vehicle 2 according to the present embodiment (autonomous driving vehicle that receives an instruction relating to the automated valet parking from the automated valet parking system 1). FIG. 12 is a block diagram illustrating an example of the autonomous driving vehicle 2. In the present embodiment, the autonomous driving vehicle 2 is not included in the automated valet parking system 1.

As illustrated in FIG. 12, the autonomous driving vehicle 2 includes an autonomous driving ECU 20 as an example. The autonomous driving ECU 20 is an electronic control unit including a CPU, a ROM, a RAM, and the like. In the autonomous driving ECU 20, for example, a program recorded in the ROM is loaded into the RAM, and various functions are implemented by the CPU executing the program loaded into the RAM. The autonomous driving ECU 20 may include a plurality of electronic units.

The autonomous driving ECU 20 is connected to a GPS reception unit 21, an external sensor 22, an internal sensor 23, a communication unit 24, and an actuator 25.

The GPS reception unit 21 measures a position of the autonomous driving vehicle 2 (for example, the latitude and longitude of the autonomous driving vehicle 2) by receiving signals from a plurality of GPS satellites. The GPS reception unit 21 transmits the measured positional information of the autonomous driving vehicle 2 to the autonomous driving ECU 20. A global navigation satellite system (GNSS) reception unit may be used instead of the GPS reception unit 21.

The external sensor 22 is an in-vehicle sensor that detects an external environment of the autonomous driving vehicle 2. The external sensor 22 includes at least a camera. The camera is an imaging device that captures an image of an external environment of the autonomous driving vehicle 2. The camera is provided, for example, behind a windshield of the autonomous driving vehicle 2 and captures an image in front of the vehicle. The camera transmits imaging information on the external environment of the autonomous driving vehicle 2 to the autonomous driving ECU 20. The camera may be a monocular camera or a stereo camera. A plurality of cameras may be provided, and in addition to the front of the autonomous driving vehicle 2, the right and left sides and the rear may be imaged.

The external sensor 22 may include a radar sensor. The radar sensor is a detection device that detects an object around the autonomous driving vehicle 2 using radio waves (for example, millimeter waves) or light. The radar sensor includes, for example, a millimeter wave radar or a light detection and ranging (LIDAR). The radar sensor transmits a radio wave or light to the vicinity of the autonomous driving vehicle 2 and detects the object by receiving the radio wave or light reflected by the object. The radar sensor transmits the detected object information to the autonomous driving ECU 20. The external sensor 22 may include a sonar sensor that detects a sound outside the autonomous driving vehicle 2.

The internal sensor 23 is an in-vehicle sensor that detects a traveling state of the autonomous driving vehicle 2. The internal sensor 23 includes a vehicle speed sensor, an acceleration sensor, and a yaw rate sensor. The vehicle speed sensor is a detector that detects the speed of the autonomous driving vehicle 2. As the vehicle speed sensor, wheel speed sensors that are provided for wheels of the autonomous driving vehicle 2 or for drive shafts that rotate integrally with the wheels and that detect rotation speeds of the respective wheels can be used. The vehicle speed sensor transmits the detected vehicle speed information (wheel speed information) to the autonomous driving ECU 20.

The acceleration sensor is a detector that detects the acceleration of the autonomous driving vehicle 2. The acceleration sensor includes, for example, a front-rear acceleration sensor that detects an acceleration in a front-rear direction of the autonomous driving vehicle 2. The acceleration sensor may include a lateral acceleration sensor that detects a lateral acceleration of the autonomous driving vehicle 2. The acceleration sensor transmits, for example, acceleration information of the autonomous driving vehicle 2 to the autonomous driving ECU 20. The yaw rate sensor is a detector that detects a yaw rate (rotational angular velocity) of the center of gravity of the autonomous driving vehicle 2 around a vertical axis. As the yaw rate sensor, for example, a gyro sensor can be used. The yaw rate sensor transmits the detected yaw rate information of the autonomous driving vehicle 2 to the autonomous driving ECU 20.

The communication unit 24 is a communication device that controls wireless communication with the outside of the autonomous driving vehicle 2. The communication unit 24 transmits and receives various types of information through communication with the parking place control server 10. The communication unit 24 transmits, for example, vehicle information to the parking place control server 10 and acquires information (for example, information on a landmark along a target route) needed for automated valet parking from the parking place control server 10.

The actuator 25 is a device used for controlling the autonomous driving vehicle 2. The actuator 25 includes at least a drive actuator, a brake actuator, and a steering actuator. The drive actuator controls the supply amount of air to the engine (throttle opening degree) according to a control signal from the autonomous driving ECU 20 to control a driving force of the autonomous driving vehicle 2. When the autonomous driving vehicle 2 is a hybrid vehicle, the control signal from the autonomous driving ECU 20 is input to a motor as a power source in addition to the supply amount of air to the engine, so that the driving force of the autonomous driving vehicle is controlled. When the autonomous driving vehicle 2 is an electric vehicle, the control signal from the autonomous driving ECU 20 is input to a motor as a power source, so that the driving force of the autonomous driving vehicle is controlled. The motor as the power source in these cases forms the actuator 25.

The brake actuator controls a brake system according to the control signal from the autonomous driving ECU 20 to control a braking force applied to the wheels of the autonomous driving vehicle 2. As the brake system, for example, a hydraulic brake system can be used. The steering actuator controls driving of an assist motor for controlling a steering torque in an electric power steering system according to the control signal from the autonomous driving ECU 20. Accordingly, the steering actuator controls the steering torque of the autonomous driving vehicle 2.

Next, an example of a functional configuration of the autonomous driving ECU 20 will be described. The autonomous driving ECU 20 includes an external environment recognition unit 31, a traveling state recognition unit 32, a host vehicle position recognition unit 33, a vehicle information providing unit 34, an autonomous driving controller 35, a vehicle-side condition determination unit 36, and an inter-vehicle communication traveling execution unit 37.

The external environment recognition unit 31 recognizes the external environment of the autonomous driving vehicle 2 based on the detection result of the external sensor 22 (the image captured by the camera or the object information detected by the radar sensor). The external environment includes a relative position of a surrounding object with respect to the autonomous driving vehicle 2. The external environment may include a relative speed and a moving direction of the surrounding object with respect to the autonomous driving vehicle 2. The external environment recognition unit 31 recognizes other vehicles and objects such as pillars of the parking place by pattern matching or the like. The external environment recognition unit 31 may recognize a parking place gate, a parking place wall, a pole, a safety cone, and the like. In addition, the external environment recognition unit 31 may recognize driving boundaries in the parking place by white line recognition.

The traveling state recognition unit 32 recognizes the traveling state of the autonomous driving vehicle 2 based on the detection result of the internal sensor 23. The traveling state includes the vehicle speed of the autonomous driving vehicle 2, the acceleration of the autonomous driving vehicle 2, and the yaw rate of the autonomous driving vehicle 2. Specifically, the traveling state recognition unit 32 recognizes the vehicle speed of the autonomous driving vehicle 2 based on the vehicle speed information of the vehicle speed sensor. The traveling state recognition unit 32 recognizes the acceleration of the autonomous driving vehicle 2 based on the vehicle speed information of the acceleration sensor. The traveling state recognition unit 32 recognizes the direction of the autonomous driving vehicle 2 based on the yaw rate information of the yaw rate sensor.

The host vehicle position recognition unit 33 recognizes the position of the autonomous driving vehicle 2 in the parking place based on the parking place map information acquired from the parking place control server 10 through the communication unit 24 and the external environment recognized by the external environment recognition unit 31.

The host vehicle position recognition unit 33 recognizes the position of the autonomous driving vehicle 2 in the parking place based on the positional information of the landmark in the parking place included in the parking place map information and the relative position of the landmark with respect to the autonomous driving vehicle 2 recognized by the external environment recognition unit 31. As the landmark, an object fixedly provided in the parking place can be used.

In addition, the host vehicle position recognition unit 33 may recognize the position of the autonomous driving vehicle 2 by dead reckoning based on the detection result of the internal sensor 23. The host vehicle position recognition unit 33 may recognize the position of the autonomous driving vehicle 2 by communicating with a beacon provided in the parking place.

The vehicle information providing unit 34 provides vehicle information to the parking place control server 10 through the communication unit 24. The vehicle information providing unit 34 provides the parking place control server 10 with vehicle information including, for example, information on the position of the autonomous driving vehicle 2 in the parking place recognized by the host vehicle position recognition unit 33 at regular intervals. The vehicle information may include the recognized external status and/or traveling state of the autonomous driving vehicle 2.

The autonomous driving controller 35 executes the autonomous driving of the autonomous driving vehicle 2. The autonomous driving controller 35 generates a trajectory of the autonomous driving vehicle 2 based on, for example, the target route, the position of the autonomous driving vehicle 2, the external environment of the autonomous driving vehicle 2, and the traveling state of the autonomous driving vehicle 2. The trajectory corresponds to a travel plan for autonomous driving. The trajectory includes a path along which the vehicle travels by autonomous driving and a vehicle speed plan in autonomous driving.

The path is a trajectory on which the vehicle that is autonomously driving will travel on the target route as instructed to the automated valet parking system. The path can be, for example, data of a change in the steering angle of the autonomous driving vehicle 2 based on the position on the target route (steering angle plan). The position on the target route is, for example, a set vertical position set at predetermined intervals (for example, 1 m) in the advancing direction on the target route. The steering angle plan is data in which a target steering angle is associated with each set vertical position. The autonomous driving controller 35 generates a trajectory to pass through the center of the traveling path of the parking place along the target route, for example.

When the parking plan (target parking space and the target route) is instructed from the parking plan generation unit 12 of the parking place control server 10 in the automated valet parking, the autonomous driving controller 35 performs the automated valet parking according to the parking plan. When the parking plan does not include a steering angle plan and the vehicle speed plan corresponding to the position, the autonomous driving controller 35 generates the steering angle plan and the vehicle speed plan on the autonomous driving vehicle 2 side to realize the automated valet parking.

The vehicle-side condition determination unit 36 determines whether the autonomous driving vehicle 2 satisfies a vehicle-side inter-vehicle communication traveling condition based on a comparison result between the traveling state of the autonomous driving vehicle 2 recognized by the traveling state recognition unit 32 and the target vehicle speed or the target route as instructed from the automated valet parking system 1.

For example, when the vehicle speed of the autonomous driving vehicle 2 at the position is greater than the target vehicle speed as instructed from the automated valet parking system 1 according to the position of the host vehicle in the parking place by a vehicle speed determination threshold value or more, the vehicle-side condition determination unit 36 determines that the autonomous driving vehicle 2 satisfies the vehicle-side inter-vehicle communication traveling condition. The vehicle speed determination threshold value is a threshold value of a preset value for determining a state of vehicle speed control of the autonomous driving vehicle 2 in automated valet parking. The vehicle speed determination threshold value is not particularly limited, but may be 10 km/h, 15 km/h, or 20 km/h.

Figure 13A:
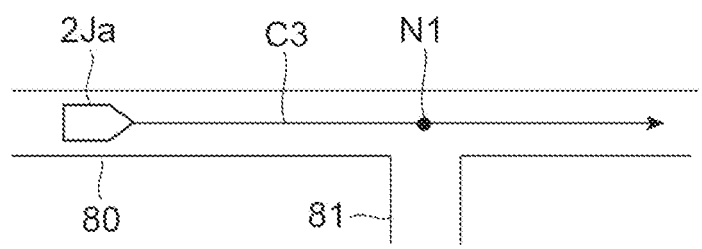
FIG. 13A is a diagram for describing an example of a set position in which a target vehicle speed is set on a target route of the autonomous driving vehicle.

FIG. 13A is a diagram for describing an example of the set position in which the target vehicle speed is set on the target route of the autonomous driving vehicle. FIG. 13A illustrates a lane 80, a branch lane 81, a node N1, an autonomous driving vehicle 2Ja, and a target route C3. The branch lane 81 branches in the middle of the lane 80 in which the autonomous driving vehicle 2Ja travels to form a T-junction. The node N1 corresponds to a set position set at an intersection point of the lane 80 and the branch lane 81 on the target route C3. A target vehicle speed is set in the node N1 by the automated valet parking system 1.

Figure 13B:
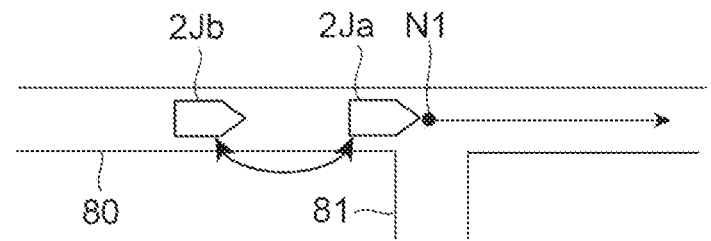
FIG. 13B is a diagram for describing an example in which a vehicle-side inter-vehicle communication traveling condition is satisfied and the inter-vehicle communication traveling is executed in the autonomous driving vehicle.

FIG. 13B is a diagram for describing an example in which the vehicle-side inter-vehicle communication traveling condition is satisfied and the inter-vehicle communication traveling is executed in the autonomous driving vehicle. In FIG. 13B, the autonomous driving vehicle 2Ja has reached the node N1. In the status illustrated in FIG. 13B, the vehicle-side condition determination unit 36 determines that the autonomous driving vehicle 2 satisfies the vehicle-side inter-vehicle communication traveling condition, when the vehicle speed of the autonomous driving vehicle 2 passed through the node N1 is greater than the target vehicle speed set by the automated valet parking system 1 at the node N1 by the vehicle speed determination threshold value or more.

The vehicle-side condition determination unit 36 may estimate an upper limit of the vehicle speed from a curvature of the target route at a position where the node (target vehicle speed) is not set, and may determine that the autonomous driving vehicle 2 satisfies the vehicle-side inter-vehicle communication traveling condition when the vehicle speed of the autonomous driving vehicle 2 exceeds the upper limit of the vehicle speed. Various well-known methods can be employed to estimate the upper limit of vehicle speed from the curvature.

When the vehicle-side condition determination unit 36 determines that the autonomous driving vehicle 2 satisfies the vehicle-side inter-vehicle communication traveling condition, the inter-vehicle communication traveling execution unit 37 executes the inter-vehicle communication traveling of the autonomous driving vehicle 2. The inter-vehicle communication traveling execution unit 37 performs the inter-vehicle communication traveling by performing the inter-vehicle communication with the target vehicle around the autonomous driving vehicle 2. The autonomous driving vehicle 2 can prevent the inter-vehicle distance from the surrounding target vehicle from becoming too close by controlling the vehicle speed according to the traveling state (acceleration, deceleration, or the like) of another vehicle acquired by using the inter-vehicle communication.

Figure 14B:
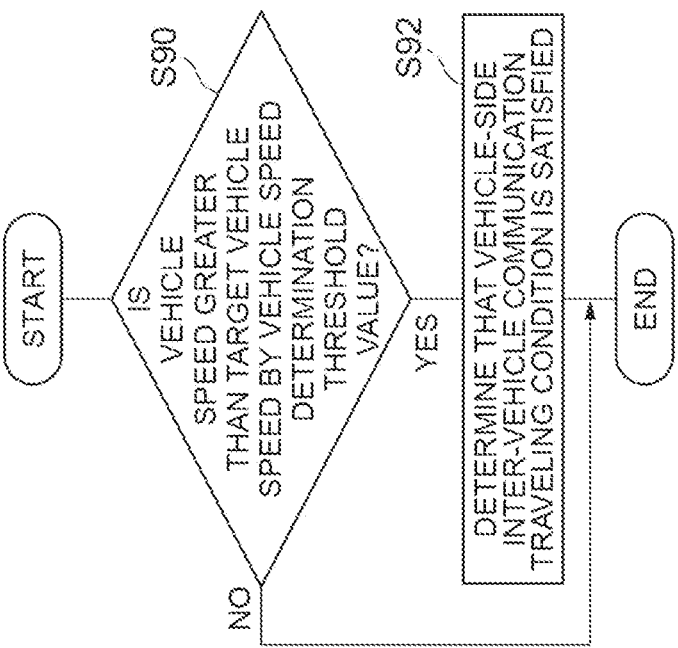
FIG. 14B is a flowchart illustrating an example of vehicle-side inter-vehicle communication traveling condition determination processing.
Figure 14A:
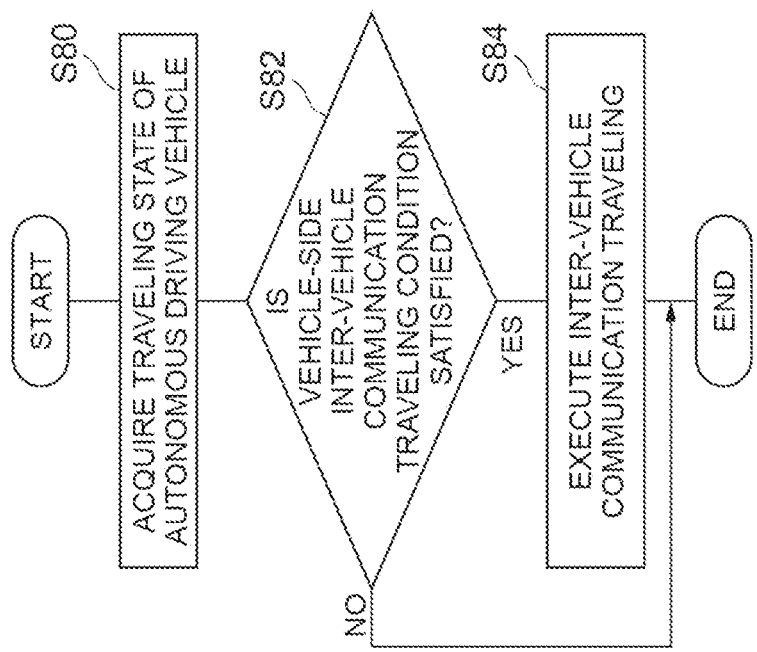
FIG. 14A is a flowchart illustrating an example of inter-vehicle communication traveling execution processing in the autonomous driving vehicle.

Subsequently, a control method of the autonomous driving vehicle 2 according to the present embodiment will be described with reference to the drawings. FIG. 14A is a flowchart illustrating an example of inter-vehicle communication traveling execution processing in the autonomous driving vehicle. The inter-vehicle communication traveling execution processing is performed during the automated valet parking.

As illustrated in FIG. 14A, the autonomous driving ECU 20 of the autonomous driving vehicle 2 recognizes the traveling state of the autonomous driving vehicle 2 by the traveling state recognition unit 32 in S80 (traveling state recognition step). The traveling state recognition unit 32 recognizes the traveling state of the autonomous driving vehicle 2 based on the detection result of the internal sensor 23.

In S82, the autonomous driving ECU 20 determines whether or not the autonomous driving vehicle 2 satisfies the vehicle-side inter-vehicle communication traveling condition by the vehicle-side condition determination unit 36 (vehicle-side inter-vehicle communication traveling condition determination step). The vehicle-side condition determination unit 36 performs the above determination based on the comparison result between the traveling state of the autonomous driving vehicle 2 recognized by the traveling state recognition unit 32 and the target vehicle speed or the target route as instructed from the automated valet parking system 1.

When it is determined that the autonomous driving vehicle 2 satisfies the vehicle-side inter-vehicle communication traveling condition (S82: YES), the autonomous driving ECU 20 shifts to S84. When it is not determined that the autonomous driving vehicle 2 satisfies the vehicle-side inter-vehicle communication traveling condition (S82: NO), the autonomous driving ECU 20 ends the current processing. Thereafter, the autonomous driving ECU 20 repeats the processing from S80 again.

In S84, the autonomous driving ECU 20 executes the inter-vehicle communication traveling of the autonomous driving vehicle 2 by the inter-vehicle communication traveling execution unit 37 (inter-vehicle communication traveling execution step). The inter-vehicle communication traveling execution unit 37 performs the inter-vehicle communication traveling by performing the inter-vehicle communication with the target vehicle around the autonomous driving vehicle 2.

Subsequently, a specific example of the vehicle-side inter-vehicle communication traveling condition determination processing (vehicle-side inter-vehicle communication traveling condition determination step) corresponding to S82 in FIG. 14A will be described. FIG. 14B is a flowchart illustrating an example of the vehicle-side inter-vehicle communication traveling condition determination processing.

As illustrated in FIG. 14B, in S90, the autonomous driving ECU 20 determines, in comparison to a target vehicle speed instructed in accordance with a position in a parking place from the automated valet parking system 1, whether a vehicle speed of the autonomous driving vehicle 2 at the position is (equal or) greater by a vehicle speed determination threshold value, by the vehicle-side condition determination unit 36. The position includes, for example, the node N1 illustrated in FIG. 13A.

When it is determined that the vehicle speed of the autonomous driving vehicle 2 is greater than the target vehicle speed by the vehicle speed determination threshold value or more (S90: YES), the autonomous driving ECU 20 shifts to S92. When it is not determined that the vehicle speed of the autonomous driving vehicle 2 is greater than the target vehicle speed by the vehicle speed determination threshold value or more (S90: NO), the autonomous driving ECU 20 ends the current processing. In S92, the autonomous driving ECU 20 determines that the vehicle-side inter-vehicle communication traveling condition is satisfied by the vehicle-side condition determination unit 36.

In accordance with the autonomous driving vehicle 2 according to the present embodiment described above, when the autonomous driving vehicle 2 satisfies the vehicle-side inter-vehicle communication traveling condition based on the comparison result between the traveling state of the autonomous driving vehicle 2 and the target vehicle speed or the target route as instructed from the automated valet parking system 1, since the vehicle speed adjustment for the vehicle approach suppression by the inter-vehicle communication is preferentially performed over the target vehicle speed for the automated valet parking by performing the inter-vehicle communication traveling by the inter-vehicle communication with the surrounding target vehicle, it is possible to prevent the inter-vehicle distance between the autonomous driving vehicle 2 and the target vehicle from becoming too close.

In accordance with the autonomous driving vehicle 2, when the vehicle speed of the autonomous driving vehicle 2 at the position is greater than the target vehicle speed as instructed from the automated valet parking system 1 according to the position of the host vehicle in the parking place by the vehicle speed determination threshold value or more, the inter-vehicle communication traveling is performed, and thus, it is possible to prevent the inter-vehicle distance between the autonomous driving vehicle 2 and the target vehicle from becoming too close even though a vehicle speed control function of the autonomous driving vehicle 2 or the responsiveness of the vehicle speed control is hindered.

Although the embodiment of the present disclosure has been described above, the present disclosure is not limited to the above-described embodiment. The present disclosure can be implemented in various forms including various modifications and improvements based on the knowledge of those skilled in the art, including the above-described embodiment.

The target vehicle may be only the autonomous driving vehicle 2. The condition determination unit 13 may not determine the inter-vehicle communication traveling condition including the communicative vehicle. The condition determination unit 13 may count only the number of autonomous driving vehicles 2. Similarly, the cancellation condition determination unit 15 may not determine the cancellation condition including the communicative vehicle.

The inter-vehicle communication traveling instruction unit 14 may not instruct the communicative vehicle to perform the inter-vehicle communication traveling. The inter-vehicle communication traveling instruction unit 14 may instruct only the autonomous driving vehicle 2 to perform the inter-vehicle communication traveling.

The automated valet parking system 1 may not include the cancellation condition determination unit 15. When the inter-vehicle communication traveling is started, the inter-vehicle communication traveling may be continued until the vehicle is parked or stopped.

The autonomous driving vehicle 2 may not determine the vehicle-side inter-vehicle communication traveling condition. The autonomous driving vehicle 2 may not include the vehicle-side condition determination unit 36 and the inter-vehicle communication traveling execution unit 37. The autonomous driving vehicle 2 may have a function capable of executing the automated valet parking.

What is claimed is:

1. An automated valet parking system that executes automated valet parking of an autonomous driving vehicle in a parking place by issuing an instruction including a target vehicle speed and a target route to the autonomous driving vehicle, the system comprising a server configured to:
   acquire positional information of the autonomous driving vehicle in the parking place;
   acquire positional information of target vehicles in the parking place including the autonomous driving vehicle and a communicative vehicle that is not capable of performing autonomous driving and is capable of performing inter-vehicle communication;
   determine whether or not the autonomous driving vehicle satisfies a preset inter-vehicle communication traveling condition based on the positional information of the autonomous driving vehicle in the parking place and the positional information of the target vehicles in the parking place;
   when the number of a plurality of the target vehicles in the same lane in the parking place is equal to or greater than a lane number threshold value, determine that the plurality of target vehicles traveling in the same lane satisfy the inter-vehicle communication traveling condition; and
   cause the autonomous driving vehicle determined to satisfy the inter-vehicle communication traveling condition to perform inter-vehicle communication traveling by inter-vehicle communication,
   wherein, in the inter-vehicle communication traveling, the autonomous driving vehicle is caused to perform inter-vehicle communication with a second vehicle, and control a speed of the autonomous driving vehicle based on a speed of the second vehicle.

2. The automated valet parking system according to claim 1, wherein the server is configured to, when there are a plurality of the target vehicles between which an inter-vehicle distance is less than an inter-vehicle distance threshold value, determine that the plurality of target vehicles between which the inter-vehicle distance is less than the inter-vehicle distance threshold value satisfy the inter-vehicle communication traveling condition.

3. The automated valet parking system according to claim 2, wherein the server is configured to:
   acquire positional information of a general vehicle which is not capable of performing autonomous driving and is not capable of performing inter-vehicle communication in the parking place, and
   when there are a plurality of the target vehicles positioned in a lane in which the general vehicle travels in the parking place, determine that the plurality of target vehicles in the lane satisfy the inter-vehicle communication traveling condition.

4. The automated valet parking system according to claim 2, wherein the server is configured to:

acquire positional information of a general vehicle which is not capable of performing autonomous driving and is not capable of performing inter-vehicle communication in the parking place, and when the general vehicle enters a set area preset in the parking place, determine that a plurality of the target vehicles in the set area satisfy the inter-vehicle communication traveling condition.

5. The automated valet parking system according to claim 2, wherein the server is configured to:

when there are the target vehicles that perform the inter-vehicle communication traveling, determine whether or not the target vehicles satisfy a preset cancellation condition based on the positional information of a plurality of the target vehicles in the parking place, and end the inter-vehicle communication traveling of the target vehicles determined to satisfy the cancellation condition.

6. The automated valet parking system according to claim 1, wherein the server is configured to:

acquire positional information of a general vehicle which is not capable of performing autonomous driving and is not capable of performing inter-vehicle communication in the parking place, and when there are a plurality of the target vehicles positioned in a lane in which the general vehicle travels in the parking place, determine that the plurality of target vehicles in the lane satisfy the inter-vehicle communication traveling condition.

7. The automated valet parking system according to claim 6, wherein the server is configured to:

when there are the target vehicles that perform the inter-vehicle communication traveling, determine whether or not the target vehicles satisfy a preset cancellation condition based on the positional information of a plurality of the target vehicles in the parking place, and end the inter-vehicle communication traveling of the target vehicles determined to satisfy the cancellation condition.

8. The automated valet parking system according to claim 1, wherein the server is configured to:

acquire positional information of a general vehicle which is not capable of performing autonomous driving and is not capable of performing inter-vehicle communication in the parking place, and when the general vehicle enters a set area preset in the parking place, determine that a plurality of the target vehicles in the set area satisfy the inter-vehicle communication traveling condition.

9. The automated valet parking system according to claim 8, wherein the server is configured to:

when there are the target vehicles that perform the inter-vehicle communication traveling, determine whether or not the target vehicles satisfy a preset cancellation condition based on the positional information of a plurality of the target vehicles in the parking place, and end the inter-vehicle communication traveling of the target vehicles determined to satisfy the cancellation condition.

10. The automated valet parking system according to claim 1, wherein the server is configured to:

when there are the target vehicles that perform the inter-vehicle communication traveling, determine whether or not the target vehicles satisfy a preset cancellation condition based on the positional information of a plurality of the target vehicles in the parking place, and end the inter-vehicle communication traveling of the target vehicles determined to satisfy the cancellation condition.

11. The automated valet parking system according to claim 1, wherein the server is configured to, when there are a plurality of the target vehicles between which an inter-vehicle distance is less than an inter-vehicle distance threshold value, determine that the plurality of target vehicles between which the inter-vehicle distance is less than the inter-vehicle distance threshold value satisfy the inter-vehicle communication traveling condition.

12. The automated valet parking system according to claim 1, wherein the server is configured to:

acquire positional information of a general vehicle which is not capable of performing autonomous driving and is not capable of performing inter-vehicle communication in the parking place, and when there are a plurality of the target vehicles positioned in a lane in which the general vehicle travels in the parking place, determine that the plurality of target vehicles in the lane satisfy the inter-vehicle communication traveling condition.

13. The automated valet parking system according to claim 1, wherein the server is configured to:

acquire positional information of a general vehicle which is not capable of performing autonomous driving and is not capable of performing inter-vehicle communication in the parking place, and when the general vehicle enters a set area preset in the parking place, determine that a plurality of the target vehicles in the set area satisfy the inter-vehicle communication traveling condition.

14. The automated valet parking system according to claim 1, wherein the server is configured to:

when there are the target vehicles that perform the inter-vehicle communication traveling, determine whether or not the target vehicles satisfy a preset cancellation condition based on the positional information of a plurality of the target vehicles in the parking place, and end the inter-vehicle communication traveling of the target vehicles determined to satisfy the cancellation condition.

15. A control method of an automated valet parking system that executes automated valet parking of an autonomous driving vehicle in a parking place by issuing an instruction including a target vehicle speed and a target route to the autonomous driving vehicle, the method comprising:

acquiring positional information of the autonomous driving vehicle in the parking place;

acquiring positional information of target vehicles in the parking place including the autonomous driving vehicle and a communicative vehicle that is not capable of performing autonomous driving and is capable of performing inter-vehicle communication;

determining whether or not the autonomous driving vehicle satisfies a preset inter-vehicle communication traveling condition based on the positional information of the autonomous driving vehicle in the parking place and the positional information of the target vehicles in the parking place acquired in the acquiring of the positional information;

when the number of a plurality of the target vehicles in the same lane in the parking place is equal to or greater than a lane number threshold value, determining that the plurality of target vehicles traveling in the same lane satisfy the inter-vehicle communication traveling condition; and causing the autonomous driving vehicle determined to satisfy the inter-vehicle communication traveling condition in the determining of the inter-vehicle communication traveling condition to perform inter-vehicle communication traveling by inter-vehicle communication, wherein, in the inter-vehicle communication traveling, the autonomous driving vehicle is caused to perform inter-vehicle communication with a second vehicle, and control a speed of the autonomous driving vehicle based on a speed of the second vehicle.

16. An autonomous driving vehicle that executes automated valet parking in a parking place based on an instruction including a target vehicle speed and a target route from an automated valet parking system of the parking place, the vehicle comprising an electronic control unit configured to:
  recognize a position of a host vehicle in the parking place;
  acquire positional information of target vehicles in the parking place including the autonomous driving vehicle and a communicative vehicle that is not capable of performing autonomous driving and is capable of performing inter-vehicle communication;
  recognize a traveling state of the autonomous driving vehicle based on an internal sensor of the autonomous driving vehicle;
  determine whether or not the autonomous driving vehicle satisfies a preset vehicle-side inter-vehicle communication traveling condition based on a comparison result between the traveling state of the autonomous driving vehicle and the target vehicle speed or the target route as instructed from the automated valet parking system;
  when the number of a plurality of the target vehicles in the same lane in the parking place is equal to or greater than a lane number threshold value, determine that the plurality of target vehicles traveling in the same lane satisfy the inter-vehicle communication traveling condition; and
  upon determination that the vehicle-side inter-vehicle communication traveling condition is satisfied, perform inter-vehicle communication traveling of the autonomous driving vehicle by inter-vehicle communication,
  wherein, in the inter-vehicle communication traveling, inter-vehicle communication with a second vehicle is performed and a speed of the autonomous driving vehicle is controlled based on a speed of the second vehicle.

17. The autonomous driving vehicle according to claim 16, wherein the electronic control unit is configured to, when a vehicle speed of the autonomous driving vehicle at a position of the host vehicle in the parking place is greater than the target vehicle speed as instructed from the automated valet parking system according to the position by a vehicle speed determination threshold value or more, determine that the vehicle-side inter-vehicle communication traveling condition is satisfied.

* * * * *